US012771529B2

(12) United States Patent
Stockmann et al.

(10) Patent No.: US 12,771,529 B2
(45) Date of Patent: Oct. 20, 2026

(54) AUTHENTICATION TUNNELING MECHANISMS FOR REMOTE CONNECTIONS

(71) Applicant: OKTA, INC., San Francisco, CA (US)

(72) Inventors: Johannes Stockmann, Woodinville, WA (US); Daniel Jeffrey Post, Pacifica, CA (US)

( * ) Notice: Subject to any disclaimer, the term of this patent is extended or adjusted under 35 U.S.C. 154(b) by 407 days.

(21) Appl. No.: 18/481,192

(22) Filed: Oct. 4, 2023

(65) Prior Publication Data

US 2025/0119275 A1 Apr. 10, 2025

(51) Int. Cl.
*H04L 9/08* (2006.01)
*H04L 9/32* (2006.01)

(52) U.S. Cl.
CPC .......... *H04L 9/0825* (2013.01); *H04L 9/3226* (2013.01); *H04L 9/3247* (2013.01)

(58) Field of Classification Search
CPC ... H04L 9/0825; H04L 9/3226; H04L 9/3247; H04L 9/321
See application file for complete search history.

(56) References Cited

U.S. PATENT DOCUMENTS 7,957,532 B2 * 6/2011 Chen ................... H04W 12/033 380/278
8,225,089 B2 * 7/2012 Wang ...................... G07F 19/20 713/168
9,832,171 B1 * 11/2017 Roth ..................... H04L 9/3247
11,063,753 B2 * 7/2021 Medvinsky ........... G06F 21/602
12,041,039 B2 * 7/2024 Lindemann ........... H04L 9/3247
12,126,613 B2 * 10/2024 Lindemann ............. H04L 63/20
2003/0177392 A1 * 9/2003 Hiltgen ................. H04L 9/3271 713/172
2004/0185931 A1 * 9/2004 Lowell .................. G07F 17/329 463/17
2012/0311322 A1 * 12/2012 Koyun ............... G06Q 20/3829 713/155
2013/0263211 A1 * 10/2013 Neuman ............... H04L 63/083 726/1
2014/0123231 A1 * 5/2014 Low .................... H04L 63/0892 726/4

(Continued)

*Primary Examiner* — Azizul Choudhury
(74) *Attorney, Agent, or Firm* — Holland & Hart LLP

(57) ABSTRACT

A method for authentication tunneling is described. The method includes transmitting an authentication prompt to a client machine via an encrypted channel between a first authenticator application running on the remote machine and a second authenticator application running on the client machine. The authentication prompt may be associated with accessing resources via an identity management system. The method may further include receiving, from the client machine via the encrypted channel, a first authentication response comprising user verification data, an identifier of the client machine, and a first digital signature of the second authenticator application. The method may further include generating, by the first authenticator application running on the remote machine, a second authentication response comprising the user verification data, the identifier of the client machine, an identifier of the remote machine, the first digital signature, and a second digital signature of the first authenticator application.

15 Claims, 17 Drawing Sheets

(56) References Cited

U.S. PATENT DOCUMENTS

| | | | | |
|---|---|---|---|---|
| 2019/0164156 | A1* | 5/2019 | Lindemann | H04L 63/0861 |
| 2020/0280550 | A1* | 9/2020 | Lindemann | H04L 9/3247 |
| 2022/0247771 | A1* | 8/2022 | Higgins | H04L 43/065 |
| 2022/0255931 | A1* | 8/2022 | Avetisov | H04L 9/3247 |
| 2024/0323171 | A1* | 9/2024 | Dietrich | H04L 9/3213 |
| 2024/0362201 | A1* | 10/2024 | Damgar | G06F 16/2358 |
| 2025/0097052 | A1* | 3/2025 | Dietrich | H04L 9/3263 |

* cited by examiner

AUTHENTICATION TUNNELING MECHANISMS FOR REMOTE CONNECTIONS

FIELD OF TECHNOLOGY

The present disclosure relates generally to identity management, and more specifically to authentication tunneling mechanisms for remote connections.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

Some phishing-resistant authentication schemes leverage device proximity to ensure that user authentication is happening directly on the machine that is requesting access to a particular resource (such as a file, document, application, or the like). However, it may be difficult to implement proximity-based authentication for users that access resources via a remote connection between a client machine (e.g., a personal device) and a remote machine (e.g., a virtual desktop or server).

SUMMARY

A method for authentication tunneling at a remote machine is described. The method may include: transmitting an authentication prompt to a client machine via an encrypted channel between a first authenticator application running on the remote machine and a second authenticator application running on the client machine, the authentication prompt associated with accessing one or more resources via an identity management system; receiving, from the client machine via the encrypted channel, a first authentication response including user verification data associated with a user of the client machine, an identifier of the client machine, and a first digital signature of the second authenticator application running on the client machine; generating, by the first authenticator application running on the remote machine, a second authentication response including the user verification data, the identifier of the client machine, an identifier of the remote machine, the first digital signature of the second authenticator application running on the client machine, and a second digital signature of the first authenticator application running on the remote machine; and transmitting the second authentication response to an authentication endpoint of the identity management system.

A remote machine is described. The remote machine may include one or more memories storing processor-executable code, and one or more processors coupled with the one or more memories. The one or more processors may be individually or collectively operable to execute the code to cause the remote machine to: transmit an authentication prompt to a client machine via an encrypted channel between a first authenticator application running on the remote machine and a second authenticator application running on the client machine, the authentication prompt associated with accessing one or more resources via an identity management system; receive, from the client machine via the encrypted channel, a first authentication response including user verification data associated with a user of the client machine, an identifier of the client machine, and a first digital signature of the second authenticator application running on the client machine; generate, by the first authenticator application running on the remote machine, a second authentication response including the user verification data, the identifier of the client machine, an identifier of the remote machine, the first digital signature of the second authenticator application running on the client machine, and a second digital signature of the first authenticator application running on the remote machine; and transmit the second authentication response to an authentication endpoint of the identity management system.

An apparatus is described. The apparatus may include: means for transmitting an authentication prompt to a client machine via an encrypted channel between a first authenticator application running on the remote machine and a second authenticator application running on the client machine, the authentication prompt associated with accessing one or more resources via an identity management system; means for receiving, from the client machine via the encrypted channel, a first authentication response including user verification data associated with a user of the client machine, an identifier of the client machine, and a first digital signature of the second authenticator application running on the client machine; means for generating, by the first authenticator application running on the remote machine, a second authentication response including the user verification data, the identifier of the client machine, an identifier of the remote machine, the first digital signature of the second authenticator application running on the client machine, and a second digital signature of the first authenticator application running on the remote machine; and means for transmitting the second authentication response to an authentication endpoint of the identity management system.

A non-transitory computer-readable medium is described. The non-transitory computer-readable medium code may store code that includes instructions executable by one or more processors to: transmit an authentication prompt to a client machine via an encrypted channel between a first authenticator application running on the remote machine and a second authenticator application running on the client machine, the authentication prompt associated with accessing one or more resources via an identity management system; receive, from the client machine via the encrypted channel, a first authentication response including user verification data associated with a user of the client machine, an identifier of the client machine, and a first digital signature of the second authenticator application running on the client machine; generate, by the first authenticator application running on the remote machine, a second authentication response including the user verification data, the identifier of the client machine, an identifier of the remote machine, the first digital signature of the second authenticator application running on the client machine, and a second digital signature of the first authenticator application running on the remote machine; and transmit the second authentication response to an authentication endpoint of the identity management system.

Some examples described herein may further include operations, features, means, or instructions for establishing the encrypted channel between the remote machine and the client machine using a secret key accessible by the client machine, where the authentication prompt and the first authentication response are encrypted with the secret key.

Some examples described herein may further include operations, features, means, or instructions for: establishing a connection between a remote client module of the client machine and a remote connection module of the remote machine; and exchanging the secret key in accordance with the connection, where establishing the encrypted channel using the secret key is based on the secret key being exchanged.

Some examples described herein may further include operations, features, means, or instructions for establishing the encrypted channel via an authentication management service having a respective connection to the client machine and the remote machine.

Some examples described herein may further include operations, features, means, or instructions for: obtaining a set of credentials associated with the user of the client machine; and establishing the encrypted channel using the set of credentials.

In some examples described herein, the set of credentials may be obtained from an authentication management service based on a verification of the set of credentials with the authentication management service that has a respective connection to the client machine and the remote machine.

In some examples described herein, the encrypted channel between the first authenticator application and the second authenticator application includes an SSH channel or a virtual channel that is established using a remote connection module of the remote machine.

In some examples described herein, the second authentication response may be locally generated by the first authenticator application running on the remote machine without an external hardware authentication device or a short-range connection.

Some examples described herein may further include operations, features, means, or instructions for: transmitting, to the authentication endpoint of the identity management system, a request to access the one or more resources via the identity management system; and receiving, from the authentication endpoint of the identity management system, the authentication prompt associated with accessing the one or more resources via the identity management system.

Some examples described herein may further include operations, features, means, or instructions for receiving, from the authentication endpoint of the identity management system, an indication that the remote machine is authorized to access the one or more resources via the identity management system.

Some examples described herein may further include operations, features, means, or instructions for transmitting, to a remote connection endpoint of the identity management system, a request to register a remote connection between the remote machine and a client machine, where authorization of the remote machine is based on verification of the second authentication response and the remote connection.

A method for authentication tunneling at a client machine is described. The method may include: establishing an encrypted channel between a first authenticator application running on a remote machine and a second authenticator application running on the client machine, where the encrypted channel is established using a secret key accessible by the client machine; receiving an authentication prompt from the remote machine via the encrypted channel, the authentication prompt associated with accessing one or more resources via an identity management system, where the authentication prompt is encrypted with the secret key associated with the client machine; obtaining user verification data from a user of the client machine in accordance with the authentication prompt, where the user verification data is obtained using the second authenticator application running on the client machine; and transmitting, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

A client machine is described. The client machine may include one or more memories storing processor-executable code, and one or more processors coupled with the one or more memories. The one or more processors may be individually or collectively operable to execute the code to cause the client machine to: establish an encrypted channel between a first authenticator application running on a remote machine and a second authenticator application running on the client machine, where the encrypted channel is established using a secret key accessible by the client machine; receive an authentication prompt from the remote machine via the encrypted channel, the authentication prompt associated with accessing one or more resources via an identity management system, where the authentication prompt is encrypted with the secret key associated with the client machine; obtain user verification data from a user of the client machine in accordance with the authentication prompt, where the user verification data is obtained using the second authenticator application running on the client machine; and transmit, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

An apparatus is described. The apparatus may include: means for establishing an encrypted channel between a first authenticator application running on a remote machine and a second authenticator application running on the client machine, where the encrypted channel is established using a secret key accessible by the client machine; means for receiving an authentication prompt from the remote machine via the encrypted channel, the authentication prompt associated with accessing one or more resources via an identity management system, where the authentication prompt is encrypted with the secret key associated with the client machine; means for obtaining user verification data from a user of the client machine in accordance with the authentication prompt, where the user verification data is obtained using the second authenticator application running on the client machine; and means for transmitting, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

A non-transitory computer-readable medium is described. The non-transitory computer-readable medium may store code that includes instructions executable by one or more processors to: establish an encrypted channel between a first authenticator application running on a remote machine and a second authenticator application running on the client machine, where the encrypted channel is established using a secret key accessible by the client machine; receive an authentication prompt from the remote machine via the encrypted channel, the authentication prompt associated with accessing one or more resources via an identity management system, where the authentication prompt is encrypted with the secret key associated with the client machine; obtain user verification data from a user of the client machine in accordance with the authentication prompt, where the user verification data is obtained using the second authenticator application running on the client machine; and transmit, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

In some examples described herein, obtaining the user verification data may include operations, features, means, or instructions for obtaining the user verification data via one or more sensors or components integrated with the second authenticator application running on the client machine, where the user verification data includes biometric information associated with the user of the client machine.

Some examples described herein may further include operations, features, means, or instructions for transmitting, to an authentication endpoint of the identity management system via the remote machine, a second authentication response including the user verification data, the identifier of the client machine, an identifier of the remote machine, the first digital signature generated by the second authenticator application running on the client machine, and a second digital signature generated by the first authenticator application running on the remote machine.

Some examples described herein may further include operations, features, means, or instructions for: establishing a connection between a remote client module of the client machine and a remote connection module of the remote machine; and exchanging the secret key via the connection, where establishing the encrypted channel using the secret key is based on exchanging the secret key.

Some examples described herein may further include operations, features, means, or instructions for establishing the encrypted channel via an authentication management service having a respective connection to the client machine and the remote machine.

A method for authentication tunneling by an identity management system is described. The method includes: receiving, from a first authenticator application running on a remote machine, a request to register a remote connection between the remote machine and a client machine; receiving, from the remote machine via an authentication endpoint of the identity management system, a request to access one or more resources via the identity management system; transmitting an authentication prompt to the remote machine via the authentication endpoint of the identity management system, the authentication prompt associated with accessing the one or more resources via the identity management system; receiving, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine; and authorizing the remote machine to access the one or more resources based on verifying the authentication response.

An identity management system is described. The identity management system may include one or more memories storing processor-executable code, and one or more processors coupled with the one or more memories. The one or more processors may be individually or collectively operable to execute the code to cause the identity management system to: receive, from a first authenticator application running on a remote machine, a request to register a remote connection between the remote machine and a client machine; receive, from the remote machine via an authentication endpoint of the identity management system, a request to access one or more resources via the identity management system; transmit an authentication prompt to the remote machine via the authentication endpoint of the identity management system, the authentication prompt associated with accessing the one or more resources via the identity management system; receive, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine; and authorize the remote machine to access the one or more resources based on verifying the authentication response.

An apparatus is described. The apparatus may include: means for receiving, from a first authenticator application running on a remote machine, a request to register a remote connection between the remote machine and a client machine; means for receiving, from the remote machine via an authentication endpoint of the identity management system, a request to access one or more resources via the identity management system; means for transmitting an authentication prompt to the remote machine via the authentication endpoint of the identity management system, the authentication prompt associated with accessing the one or more resources via the identity management system; means for receiving, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine; and means for authorizing the remote machine to access the one or more resources based on verifying the authentication response.

A non-transitory computer-readable medium is described. The non-transitory computer-readable medium may store code that includes instructions executable by one or more processors to: receive, from a first authenticator application running on a remote machine, a request to register a remote connection between the remote machine and a client machine; receive, from the remote machine via an authentication endpoint of the identity management system, a request to access one or more resources via the identity management system; transmit an authentication prompt to the remote machine via the authentication endpoint of the identity management system, the authentication prompt associated with accessing the one or more resources via the identity management system; receive, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine; and authorize the remote machine to access the one or more resources based on verifying the authentication response.

In some examples described herein, authorizing the remote machine may include operations, features, means, or instructions for: verifying the first digital signature using a first set of credentials associated with the user of the client machine; and verifying the second digital signature using a second set of credentials associated with the user of the client machine.

In some examples described herein, authorizing the remote machine may include operations, features, means, or instructions for verifying that the user of the client machine may be authorized to access the remote machine based on determining that that remote connection between the remote machine and the client machine is registered with the identity management system.

DETAILED DESCRIPTION

Figure 1:
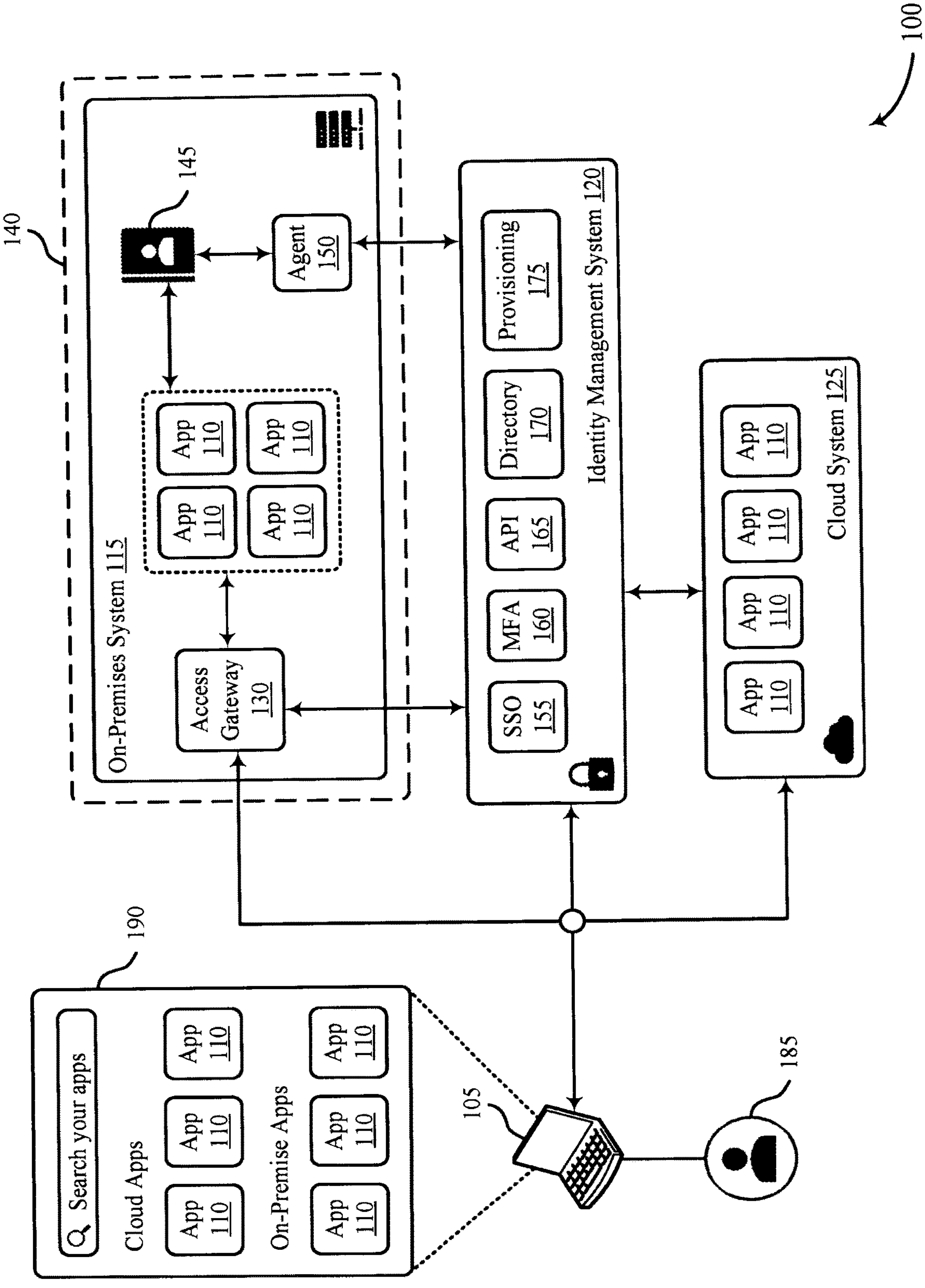
FIG. 1 illustrates an example of a computing system that supports authentication tunneling mechanisms for remote connections in accordance with aspects of the present disclosure.

Some applications and services may employ security measures to protect users from phishing attacks. As described herein, phishing is a type of cyberattack where a malicious actor/agent impersonates a legitimate entity or website to deceive users to revealing sensitive information (e.g., passwords, usernames, financial data). Phishing-resistant authentication methods like multi-factor authentication (MFA), token-based authentication, and biometric authentication may help deter/prevent phishing attacks by making it difficult for malicious actors to gain access to protected resources (e.g., files, applications, documents) using stolen credentials. For example, if an attacker obtains a user's password through a phishing scheme, the attacker may be unable to access the user's account without additional factors (such as a push notification or one-time code).

Many phishing-resistant authentication schemes rely on user-device proximity to ensure that authentication is happening directly on the machine that is requesting access to a given resource. However, proximity-based authentication schemes may be unsuitable for users that access resources (e.g., files, documents, applications) via a remote machine. For example, some organizations may leverage virtual desktop infrastructure (VDI), remote desktop protocol (RDP), and/or virtual network computing (VNC) to provide remote access for users, employees, clients, customers, contractors, etc. In such cases, proof of possession factors (such as biometrics, one-time codes, and tokens) may be insufficient, as users may not have direct access to the remote machine/device being used to access the requested resources.

In accordance with aspects of the present disclosure, a remote machine (e.g., a virtual desktop or server) may create a trusted channel between a first authenticator application running on the remote machine and a second authenticator running on a client machine (e.g., a personal computing device), such that phishing-resistant authentication factors (e.g., biometric information) can be securely tunneled from the client machine to the remote machine. For example, the first authenticator application may receive a first authentication response from the second authenticator application via the trusted/encrypted channel between the two devices. The first authentication response may include user verification data (e.g., a locally generated credential), an identifier of the client machine, and a first digital signature generated by the second authenticator application.

Upon receiving the first authentication response from the second authenticator application, the first authenticator application may generate a second authentication response by appending a second digital signature and other metadata (such as an identifier of the remote machine) to the first digital signature. The first authenticator may send the second authentication response to an identity management system, which may verify the user, the client machine, and the remote machine based on the contents of the second authentication response. Once authorized, the end-user may use the remote connection between the client machine and the remote machine to access one or more resources via the identity management system. The techniques described herein offer phishing-resistant authentication for remote users without the hassle of enrolling additional authenticators, third-party software, etc.

Aspects of the disclosure are initially described in the context of computing systems, network diagrams, and process flows. Aspects of the disclosure are further illustrated by and described with reference to apparatus diagrams, system diagrams, and flowcharts that relate to authentication tunneling mechanisms for remote connections.

FIG. 1 illustrates an example of a computing system 100 that supports authentication tunneling mechanisms for remote connections in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

In accordance with the techniques described herein, a remote machine may transmit an authentication prompt to a client machine (such as the computing device 105) via an encrypted channel between a first authenticator application running on the remote machine and a second authenticator application running on the client machine. The authentication prompt may be associated with accessing one or more resources via the identity management system 120. The remote machine may receive, via the encrypted channel, a first authentication response including user verification data associated with a user 185 of the client machine, an identifier of the client machine, and a first digital signature of the second authenticator application. The first authenticator application generate a second authentication response including the user verification data, the identifier of the client machine, an identifier of the remote machine, the first digital signature of the second authenticator application, and a second digital signature of the first authenticator application. The second authenticator application may transmit the second authentication response to an authentication endpoint of the identity management system 120.

Figure 2:
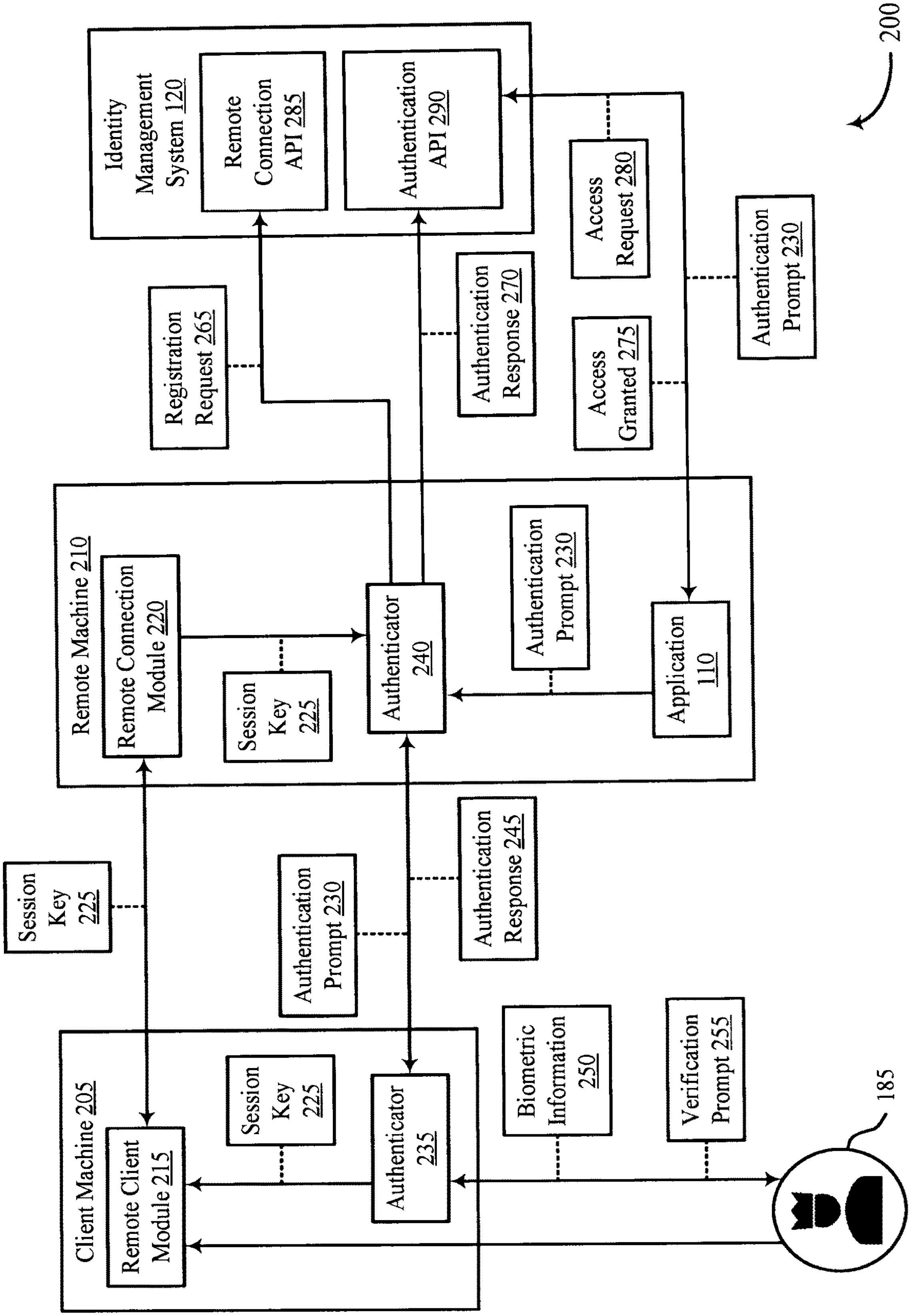
FIGS. 2 and 3 show examples of network diagrams that support authentication tunneling mechanisms for remote connections in accordance with aspects of the present disclosure.

FIG. 2 shows an example of a network diagram 200 that supports authentication tunneling mechanisms for remote connections in accordance with aspects of the present disclosure. The network diagram 200 may implement one or more aspects of the computing system 100. For example, the network diagram 200 includes an application 110 and an identity management system 120, which may be examples of corresponding elements shown and described with reference to FIG. 1. The network diagram 200 also includes a client machine 205, which may be an example of one or more aspects of the computing device 105 shown and described with reference to FIG. 1. Similarly, the network diagram 200 includes a remote machine 210, which may be located within, managed by, or otherwise associated with the on-premises system 115 or the cloud system 125.

As described herein, many enterprises, applications 110, and services use phishing-resistant authentication schemes to protect sensitive data and deter/prevent cyberattacks. However, some phishing-resistant authentication schemes may be unsuitable for remote access protocols (such as VDI, RDP, VNC, and the like). One way to prevent phishing is to ensure that authentication is happening directly on the machine that is requesting access or a device that is in direct proximity of the machine requesting access. This may be problematic for remote machines 210 that are accessed remotely, since factors that are directly enrolled on the remote machine 210 cannot be trusted, as they are not in direct control of the user 185 that initiated the authentication (e.g., the user 185 of the client machine 205, not the remote machine 210).

For example, proof of possession factors (e.g., credentials) on the remote machine 210 may be insufficient, as the user 185 may not have direct access to the remote machine 210. Furthermore, remote machines 210 may not support biometric verification of the user 185. Thus, to verify the user 185 for remote access, the identity management system 120 (e.g., an IDP or verifier) may have to use separate phish-able factors that are not bound to the remote machine 210 (but bound to the identity of the user 185 for which the authentication process was invoked). However, using secondary factors on a separate machine (such as the remote machine 210) can be problematic, as such factors are typically not phishing-resistant (since user-device proximity cannot be guaranteed). Other solutions involve switching to a third device, which may degrade user experience and offer little (if any) phishing resistance.

Aspects of the present disclosure generally provide for creating a trusted channel between an authenticator application 235 running on the client machine 205 and an authenticator application 240 running on the remote machine 210, such that the remote machine 210 can use the trusted channel to proxy authentication requests (e.g., an authentication prompt 230) to the client machine 205 (also referred to as a host machine or device) via the remote connection. The techniques described herein may enable the user 185 to securely authenticate using phishing resistant factors on the client machine 205. Additionally, the described techniques may enable the user 185 to use an authentication method they are already familiar with, avoiding the overhead of enrolling additional authenticators and/or switching to another device.

To establish a connection between the client machine 205 and the remote machine 210, an authenticator application 235 installed on the client machine 205 and an authenticator application 240 installed on the remote machine 210 (e.g., a target server) may create an additional channel directly between the two authenticators. In some implementations, the same authenticator application may be installed on the client machine 205 as well as the remote machine 210. In other implementations, the authenticator application 235 installed on the client machine 205 may be different from the authenticator application 240 installed on the remote machine 210. For Windows systems, the encrypted/trusted channel between the authenticator application 235 and the authenticator application 240 may (in some examples) be implemented as a virtual channel using a remote desktop service (RDS). For other systems, the encrypted/trusted channel may (in some examples) be implemented as an additional secure shell (SSH) channel between the client machine 205 and the remote machine 210.

In the network diagram 200, a secure connection/channel between the client machine 205 and the remote machine 210 (e.g., a virtual machine) can be created using the authenticator application 235 on the client machine 205, the authenticator application 240 on the remote machine 210, or another application/component of the client machine 205 and/or the remote machine 210. For instance, the client machine 205 may establish trust by exchanging one or more encryption secrets (such as a session key 225) with the remote machine 210 during the connection process. In other examples, trust can be established by using a mobile device management (MDM) service to deploy credentials to both the client machine 205 and the remote machine 210 (as shown and described in the example of FIG. 3). Thus, verification of the remote credentials can be done via a direct communication channel or through another service, such as a backend service provided by the identity management system 120.

In contrast to Push authenticators (where a remote machine 210 asks a local user 185 to verify a login) and other "phish-able" methods like time-based one time password (TOTP), the techniques described herein involve using the authenticator application 235 (e.g., a local authenticator) to perform cryptographic attestation of the machine identity of the authenticator application 240 (e.g., the remote authenticator) using a pre-enrolled credential that is linked to the same user identity. The resulting user experience is more secure and more user-friendly, as the user 185 can login with local biometric information 250 (as opposed to a personally identification number (PIN) or password), and the user verification factor (e.g., biometric data, PIN, or password) is provided locally, not over a connection to the remote machine 210.

If both the client machine 205 and the remote machine 210 are running Windows, it may be possible to configure universal serial bus (USB) forwarding between the client machine 205 and the remote machine 210, such that a physical security device (plugged into the client machine 205) can be used to authenticate on the remote machine 210. This approach can be phishing-resistant if the user 185 is not deceived or tricked into authenticating with their security key/device. However, this approach may not work if the client machine 205 and/or the remote machine 210 are not Windows devices. Thus, organizations that use VDI to run Windows software on the remote machine 210 may be unable to leverage this approach for client machines 205 that run on a different operating system (OS). By contrast, the techniques described herein are OS-agnostic, providing phishing-resistant authentication for Windows devices and non-Windows devices (such as macOS devices) without the use of a physical security device.

In the example of FIG. 2, a remote client module 215 (e.g., remote client software) of the client machine 205 may establish a connection with a remote connection module 220 (e.g., remote connection service) of the remote machine 210. Once established, the remote client module 215 and the remote connection module 220 may exchange a session key 225 via the remote connection. In some implementations, the authenticator application 235 running on the client machine 205 may provide the session key 225 to the remote client module 215, and the remote connection module 220 of the remote machine 210 may provide the session key 225 to the authenticator application 240.

In some implementations, the authenticator application 240 running on the remote machine 210 may transmit a registration request 265 to a remote connection API endpoint 285 of the identity management system 120. The registration request 265 may include details about the remote connection between the client machine 205 and the remote machine 210, such as an identifier of the client machine 205, an identifier of the remote machine 210, an identifier of the user 185, etc.

In response to a command or instruction from the user 185, an application 110 (e.g., browser) running on the client machine 205 may transmit a request 280 to access one or more resources via the identity management system 120. The application 110 may transmit the request 280 to an authentication API endpoint 290 of the identity management system 120, which may return an authentication prompt 230 to the application 110. Accordingly, the applications 110 may send the authentication prompt 230 to the authenticator application 240, which may forward the authentication prompt 230 to the authenticator application 235. The authenticator application 240 may use the session key 225 to encrypt the authentication prompt 230 before transmission.

Upon receiving the authentication prompt 230, the authenticator application 235 may present or otherwise display a verification prompt 255 to the user 185 of the client machine 205. In response, the user 185 may provide some form of biometric information 250, such as a fingerprint scan, facial recognition data, etc. After verifying the biometric information 250 provided by the user 185, the authenticator application 235 may generate an authentication response 245 (e.g., a signed authentication response), which includes user verification data (such as a user ID) and an identifier of the client machine 205. The authentication response 245 may be encrypted with the session key 225.

Accordingly, the authenticator application 235 may transmit the authentication response 245 to the authenticator application 240, which may generate an authentication response 270 (e.g., a double-signed authentication response) based on the authentication response 245 provided by the authenticator application 235. The authentication response 270 may include user verification data (such as a user ID), an identifier of the client machine 205, an identifier of the remote machine 210, etc. The authenticator application 240 may send the authentication response 270 to the authentication API endpoint 290 of the identity management system 120, which may verify the contents of the authentication response 270 and return a message 275 to the application 110 running on the remote machine 210. If the identity management system 120 determines that the authentication response 270 is valid, the message 275 may grant the remote machine 210 access to the requested resources.

Figure 3:
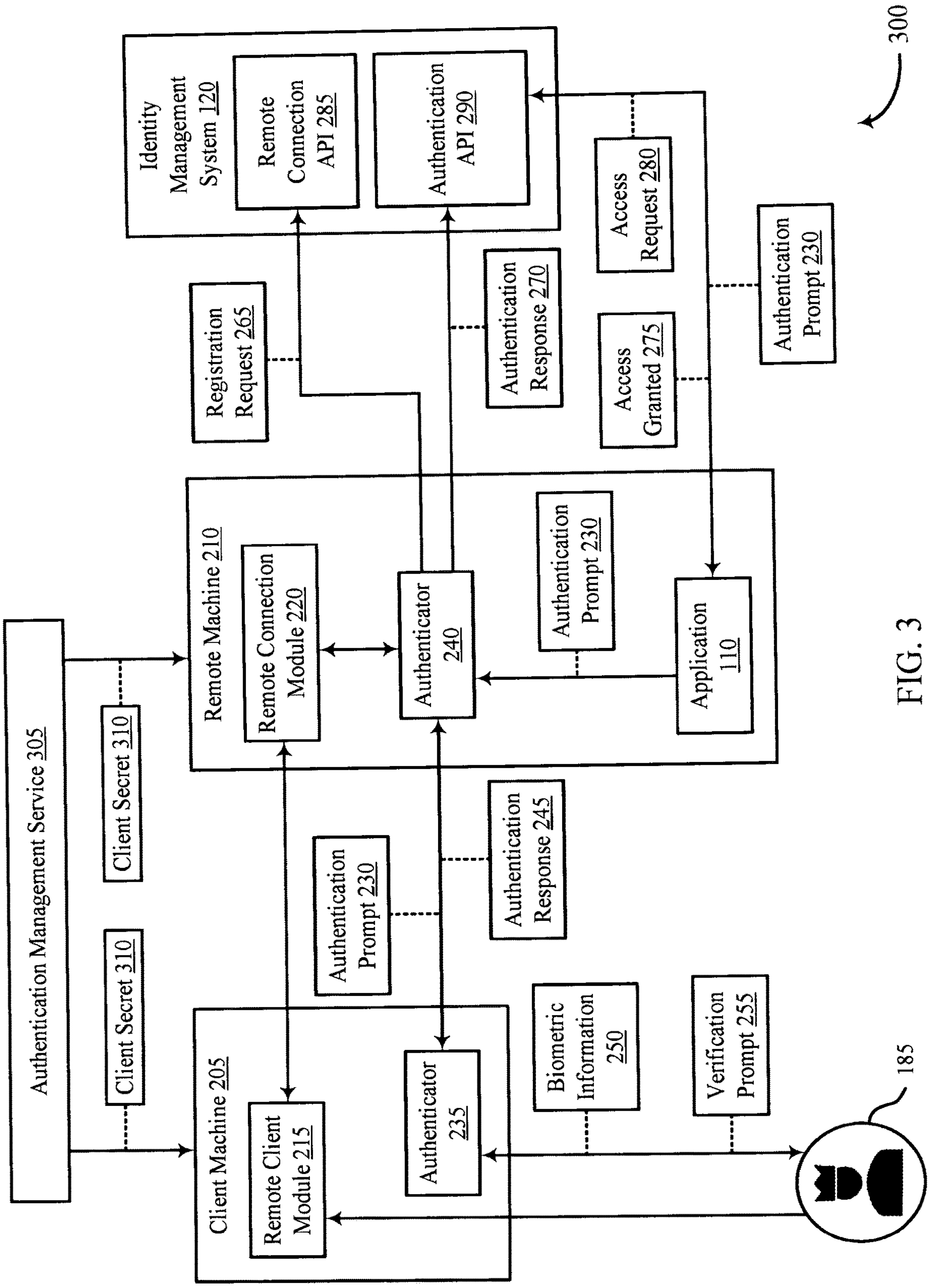

FIG. 3 shows an example of a network diagram 300 that supports authentication tunneling mechanisms for remote connections in accordance with aspects of the present disclosure. The network diagram 300 may implement one or more aspects of the computing system 100 or the network diagram 200. For example, the network diagram 300 includes an application 110 and an identity management system 120, which may be examples of corresponding elements shown and described with reference to FIG. 1. The network diagram 300 also includes a client machine 205 and a remote machine 210, which may be examples of corresponding devices shown and described with reference to FIG. 2. In the network diagram 300, an authentication management service 305 (such as an MDM service of the identity management system 120) may securely distribute a client secret 310 (such as the session key 225) to the client machine 205 and the remote machine 210.

As described herein, many enterprises, applications 110, and services use phishing-resistant authentication schemes to protect sensitive data and deter/prevent cyberattacks. However, some phishing-resistant authentication schemes may be unsuitable for remote access protocols (such as VDI, RDP, VNC, and the like). One way to prevent phishing is to ensure that authentication is happening directly on the machine that is requesting access or a device that is in direct proximity of the machine requesting access. This may be problematic for remote machines 210 that are accessed remotely, since factors that are directly enrolled on the remote machine 210 cannot be trusted, as they are not in direct control of the user 185 that initiated the authentication (e.g., the user 185 of the client machine 205, not the remote machine 210).

For example, proof of possession factors (e.g., credentials) on the remote machine 210 may be insufficient, as the user 185 may not have direct access to the remote machine 210. Furthermore, remote machines 210 may not support biometric verification of the user 185. Thus, to verify the user 185 for remote access, the identity management system 120 (e.g., an IDP or verifier) may have to use separate phish-able factors that are not bound to the remote machine 210 (but bound to the identity of the user 185 for which the authentication process was invoked). However, using secondary factors on a separate machine (such as the remote machine 210) can be problematic, as such factors are typically not phishing-resistant (since user-device proximity cannot be guaranteed). Other solutions involve switching to a third device, which may degrade user experience and offer little (if any) phishing resistance.

Aspects of the present disclosure generally provide for creating a trusted channel between an authenticator application 235 running on the client machine 205 and an authenticator application 240 running on the remote machine 210, such that the remote machine 210 can use the trusted channel to proxy authentication requests (e.g., an authentication prompt 230) to the client machine 205 (also referred to as a host machine or device) via the remote connection. The techniques described herein may enable the user 185 to securely authenticate using phishing resistant factors on the client machine 205. Additionally, the described techniques may enable the user 185 to use an authentication method they are already familiar with, avoiding the overhead of enrolling additional authenticators and/or switching to another device.

To establish a connection between the client machine 205 and the remote machine 210, an authenticator application 235 installed on the client machine 205 and an authenticator application 240 installed on the remote machine 210 (e.g., a target server) may create an additional channel directly between the two authenticators. In some implementations, the same authenticator application may be installed on the client machine 205 as well as the remote machine 210. In other implementations, the authenticator application 235 installed on the client machine 205 may be different from the authenticator application 240 installed on the remote machine 210. For Windows systems, the encrypted/trusted channel between the authenticator application 235 and the authenticator application 240 may (in some examples) be implemented as a virtual channel using an RDS. For other systems, the encrypted/trusted channel may (in some examples) be implemented as an additional SSH channel between the client machine 205 and the remote machine 210.

In the network diagram 300, a secure connection/channel between the client machine 205 and the remote machine 210 (e.g., a virtual machine) can be created using the authenticator application 235 on the client machine 205, the authenticator application 240 on the remote machine 210, or another application/component of the client machine 205 and/or the remote machine 210. Trust can be established by using the authentication management service 305 (e.g., an MDM service) to deploy credentials to both the client machine 205 and the remote machine 210. In such examples, the authenticator application 235 and the authenticator application 240 may use the credentials provided by the authentication management service 305 to create the trusted channel. For authentication attempts on the remote machine 210, the authenticator application 240 (e.g., the remote authenticator) may use the identity of the authentication management service 305 (e.g., an enrollment and broker service) to invoke the secure/trusted channel and perform a mutual cryptographic authentication request.

In contrast to Push authenticators (where a remote machine 210 asks a local user 185 to verify a login) and other "phish-able" methods like time-based one time password (TOTP), the techniques described herein involve using the authenticator application 235 (e.g., a local authenticator) to perform cryptographic attestation of the machine identity of the authenticator application 240 (e.g., the remote authenticator) using a pre-enrolled credential that is linked to the same user identity. The resulting user experience is more secure and more user-friendly, as the user 185 can login with local biometric information 250 (as opposed to a PIN or password), and the user verification factor (e.g., biometric data, PIN, or password) is provided locally, not over a connection to the remote machine 210.

If both the client machine 205 and the remote machine 210 are running Windows, it may be possible to configure USB forwarding between the client machine 205 and the remote machine 210, such that a physical security device (plugged into the client machine 205) can be used to authenticate on the remote machine 210. This approach can be phishing-resistant if the user 185 is not deceived or tricked into authenticating with their security key/device. However, this approach may not work if the client machine 205 and/or the remote machine 210 are not Windows devices. Thus, organizations that use VDI to run Windows software on the remote machine 210 may be unable to leverage this approach for client machines 205 that run on a different OS. In contrast, the techniques described herein are OS-agnostic, providing phishing-resistant authentication for Windows devices and non-Windows devices (such as macOS devices) without the use of a physical security device.

In the example of FIG. 3, a remote client module 215 (e.g., remote client software) of the client machine 205 may establish a connection with a remote connection module 220 (e.g., remote connection service) of the remote machine 210. Once established, the authentication management service 305 may deploy the client secret 310 to the client machine 205 and the remote machine 210. In some implementations, the authentication management service 305 may establish a client/remote relationship and verify user ownership before deploying the client secret 310 to the client machine 205 and the remote machine 210. The client machine 205 and the remote machine 210 may use the client secret 310 to establish a secure channel between the authenticator application 235 and the authenticator application 240.

In some implementations, the authenticator application 240 running on the remote machine 210 may transmit a registration request 265 to a remote connection API endpoint 285 of the identity management system 120. The registration request 265 may include details about the remote connection between the client machine 205 and the remote machine 210, such as an identifier of the client machine 205, an identifier of the remote machine 210, an identifier of the user 185, etc.

In response to a command or instruction from the user 185, an application 110 (e.g., browser) running on the client machine 205 may transmit a request 280 to access one or more resources via the identity management system 120. The application 110 may transmit the request 280 to an authentication API endpoint 290 of the identity management system 120, which may return an authentication prompt 230 to the application 110. Accordingly, the applications 110 may send the authentication prompt 230 to the authenticator application 240, which may forward the authentication prompt 230 to the authenticator application 235. The authenticator application 240 may use the client secret 310 to encrypt the authentication prompt 230 before transmission.

Upon receiving the authentication prompt 230, the authenticator application 235 may present or otherwise display a verification prompt 255 to the user 185 of the client machine 205. In response, the user 185 may provide some form of biometric information 250, such as a fingerprint scan, facial recognition data, etc. After verifying the biometric information 250 provided by the user 185, the authenticator application 235 may generate an authentication response 245 (e.g., a signed authentication response), which includes user verification data (such as a user ID) and an identifier of the client machine 205. The authentication response 245 may be encrypted with the client secret 310.

Accordingly, the authenticator application 235 may transmit the authentication response 245 to the authenticator application 240, which may generate an authentication response 270 (e.g., a double-signed authentication response) based on the authentication response 245 provided by the authenticator application 235. The authentication response 270 may include user verification data (such as a user ID), an identifier of the client machine 205, an identifier of the remote machine 210, etc. The authenticator application 240 may send the authentication response 270 to the authentication API endpoint 290 of the identity management system 120, which may verify the contents of the authentication response 270 and return a message 275 to the application 110 running on the remote machine 210. If the identity management system 120 determines that the authentication response 270 is valid, the message 275 may grant the remote machine 210 access to the requested resources.

Figure 4:
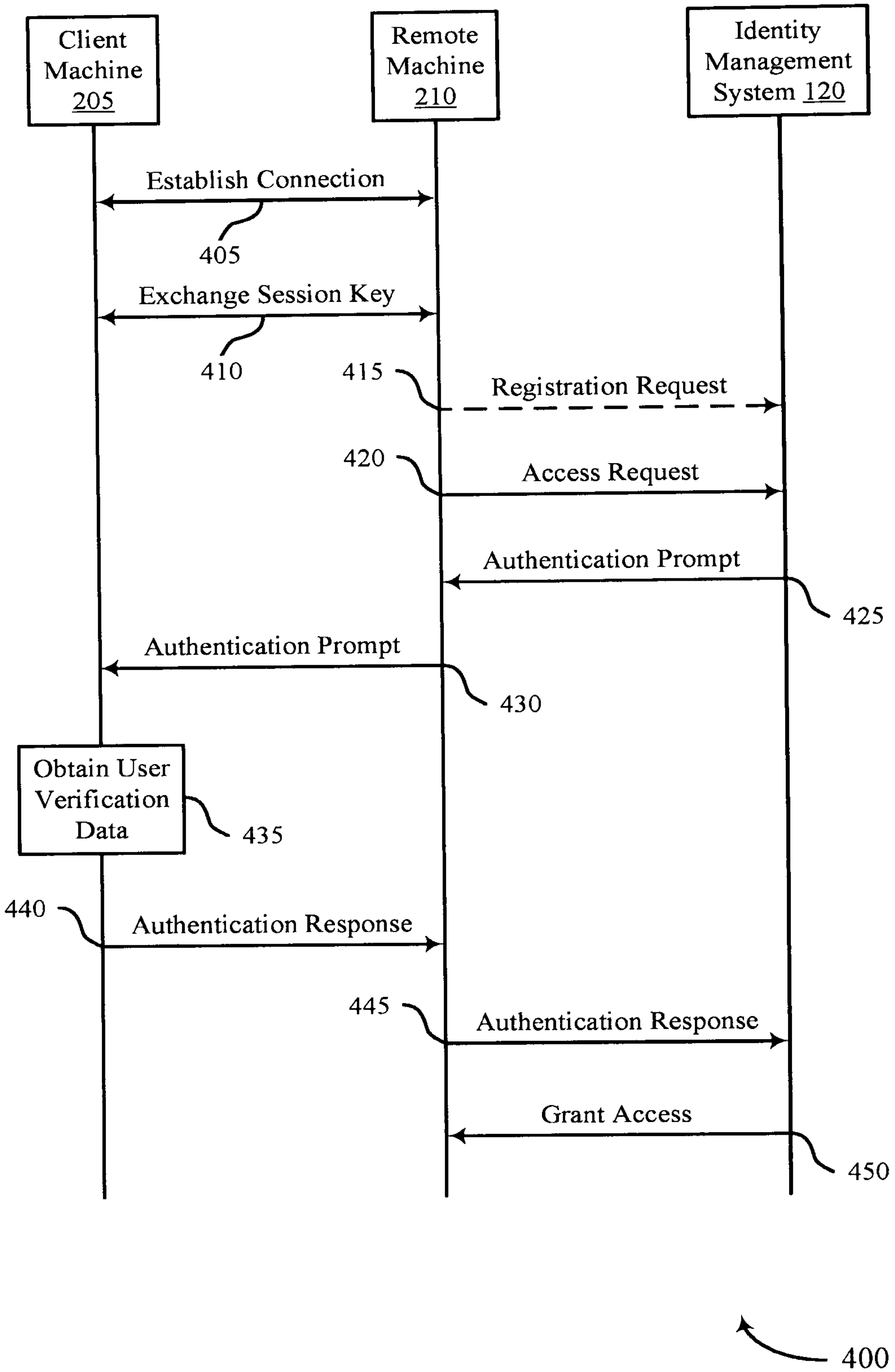
FIGS. 4 and 5 show examples of process flows that support authentication tunneling mechanisms for remote connections in accordance with aspects of the present disclosure.

FIG. 4 shows an example of a process flow 400 that supports authentication tunneling mechanisms for remote connections in accordance with aspects of the present disclosure. The process flow 400 may implement one or more aspects of the computing system 100, the network diagram 200, and/or the network diagram 300. For example, the process flow 400 includes a client machine 205, a remote machine 210, and an identity management system 120, which may be examples of corresponding elements shown and described with reference to FIGS. 1 through 3. In the following description of the process flow 400, operations between the client machine 205, the remote machine 210, and the identity management system 120 may be added, omitted, or performed in a different order (with respect to the order shown in the example of FIG. 4).

At 405, the client machine 205 may establish a connection with the remote machine 210 via a remote client module 215 of the client machine 205 and a remote connection module 220 of the remote machine 210. At 410, the client machine 205 may exchange a session key 225 with the remote machine 210 via the connection between the remote client module 215 and the remote connection module 220. Accordingly, the client machine 205 and the remote machine 210 may use the session key 225 to establish an encrypted channel between an authenticator application 235 running on the client machine 205 and an authenticator application 240 running on the remote machine 210.

In some implementations, at 415, the remote machine 210 may transmit a registration request 265 to a remote connection API endpoint 285 of the identity management system 120. The registration request 265 may enable the remote machine 210 to register the remote connection (between the client machine 205 and the remote machine 210) with the identity management system 120. Once registered, the identity management system 120 may use the registration details associated with the remote connection to verify subsequent authentication requests from the remote machine 210.

At 420, the remote machine 210 may transmit a request 280 to access one or more resources via the identity management system 120. The remote machine 210 may transmit the request 280 in response to a command or instruction from the user 185 of the client machine 205. At 425, the identity management system 120 may transmit an authentication prompt 230 to the remote machine 210 via an authentication API endpoint 290 of the identity management system 120. The authentication prompt 230 may be associated with accessing the one or more resources via the identity management system 120.

At 430, the remote machine 210 may transmit the authentication prompt 230 to the client machine 205 via the encrypted channel between the authenticator application 240 running on the remote machine 210 and the authenticator application 235 running on the client machine 205. In some implementations, the encrypted channel between the authenticator application 235 and the authenticator application 240 may be a direct network connection, where one of the authenticator applications (such as the authenticator application 235) opens a port as a server to receive client connections from the other authenticator application (such as the authenticator application 240).

At 435, the authenticator application 235 running on the client machine 205 may obtain user verification data via one or more sensors or components integrated with the authenticator application 235. For example, the authenticator application 235 may cause the client machine 205 to present or otherwise display a verification prompt 255 to the user 185. In some implementations, the user verification data may include biometric information 250 associated with the user 185 of the client machine 205, such as facial recognition data, voice recognition data, fingerprint scanning data, etc. The authenticator application 235 may include the user verification data in an authentication response 245 that is returned to the authenticator application 240 via the encrypted channel.

At 440, the remote machine 210 may receive the authentication response 245 from the client machine 205. The authentication response 245 may include the user verification data associated with the user 185 of the client machine 205, an identifier of the client machine 205, and a first digital signature of the authenticator application 235 running on the client machine 205. The remote machine 210 may receive the authentication response 245 from the client machine 205 via the encrypted channel between the authenticator application 235 and the authenticator application 240. In some implementations, the encrypted channel may include an SSH channel or virtual channel established via the remote connection module 220 of the remote machine 210.

Accordingly, the authenticator application 240 running on the remote machine 210 may generate an authentication response 270 that contains the user verification data, the identifier of the client machine 205, an identifier of the remote machine 210, the first digital signature of the authenticator application 235 running on the client machine 205, and a second digital signature of the authenticator application 240 running on the remote machine 210. In some examples, the authentication response 270 may include an attestation of the machine's identity. Within this attestation, the remote machine 210 may wrap the registration request 265 provided by the authenticator application 235, thereby establishing the user's identity. In other words, the authenticator application 240 (e.g., the remote authenticator) may attest to the remote machine's identity, and the authenticator application 235 on the client machine 205 may handle other aspects of cryptographic attestation. At 445, the authenticator application 240 may transmit the authentication response 270 to the authentication API endpoint 290 of the identity management system 120.

At 450, the identity management system 120 may authorize the user 185 of the client machine 205 to access the one or more resources via the remote machine 210 based on verifying the authentication response 270 provided by the authenticator application 240. Accordingly, the identity management system 120 may transmit a message 275 to the remote machine 210, indicating that access has been granted. In some implementations, the message 275 may include a token or other information that enables the remote machine 210 to gain access to the one or more resources. In some examples, the identity management system 120 may redirect the remote machine 210 to the one or more resources requested by the user 185.

Figure 5:
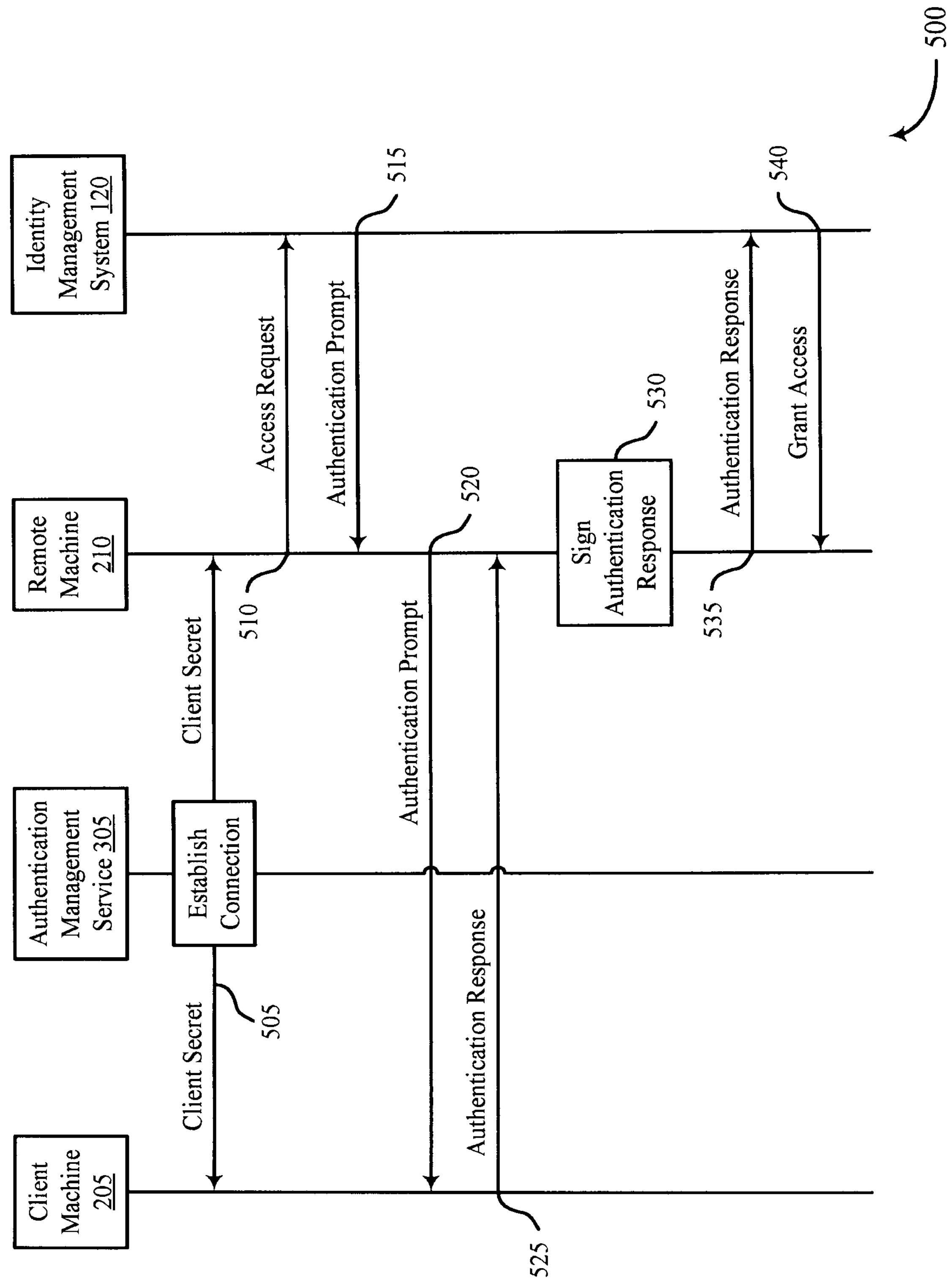

FIG. 5 shows an example of a process flow 500 that supports authentication tunneling mechanisms for remote connections in accordance with aspects of the present disclosure. The process flow 500 may implement one or more aspects of the computing system 100, the network diagram 200, and/or the network diagram 300. For example, the process flow 500 includes a client machine 205, an authentication management service 305, a remote machine 210, and an identity management system 120, which may be examples of corresponding elements shown and described with reference to FIGS. 1 through 3. In the following description of the process flow 500, operations between the client machine 205, the authentication management service 305, the remote machine 210, and the identity management system 120 may be added, omitted, or performed in a different order (with respect to the order shown in the example of FIG. 5).

At 505, the authentication management service 305 may securely deploy a client secret 310 (also referred to as a secret key or a remote credential) to an authenticator application 235 running on the client machine 205 and an authenticator application 240 running on the remote machine 210. In some examples, the authentication management service 305 may be implemented as a backend MDM service of the identity management system 120. In some implementations, the authentication management service 305 may establish user ownership and establish a relationship between the client machine 205 and the remote machine 210 before deploying the client secret 310. Once deployed, the client machine 205 and the remote machine 210 may use the client secret 310 to establish an encrypted channel between the authenticator application 235 and the authenticator application 240.

In some implementations, the remote machine 210 may transmit a registration request 265 to a remote connection API endpoint 285 of the identity management system 120. The registration request 265 may enable the remote machine 210 to register the remote connection (between the client machine 205 and the remote machine 210) with the identity management system 120. Once registered, the identity management system 120 may use the registration details associated with the remote connection to verify subsequent authentication requests from the remote machine 210.

At 510, the remote machine 210 may transmit a request 280 to access one or more resources via the identity management system 120. The remote machine 210 may transmit the request 280 in response to a command or instruction from the user 185 of the client machine 205. At 515, the identity management system 120 may transmit an authentication prompt 230 to the remote machine 210 via an authentication API endpoint 290 of the identity management system 120. The authentication prompt 230 may be associated with accessing the one or more resources via the identity management system 120.

At 520, the remote machine 210 may transmit the authentication prompt 230 to the client machine 205 via the encrypted channel between the authenticator application 240 running on the remote machine 210 and the authenticator application 235 running on the client machine 205. In some implementations, the encrypted channel between the authenticator application 235 and the authenticator application 240 may be a direct network connection, where one of the authenticator applications (such as the authenticator application 235) opens a port as a server to receive client connections from the other authenticator application (such as the authenticator application 240).

Accordingly, the authenticator application 235 running on the client machine 205 may obtain user verification data via one or more sensors or components integrated with the authenticator application 235. For example, the authenticator application 235 may cause the client machine 205 to present or otherwise display a verification prompt 255 to the user 185. In some implementations, the user verification data may include biometric information 250 associated with the user 185 of the client machine 205, such as facial recognition data, voice recognition data, fingerprint scanning data, etc. The authenticator application 235 may include the user verification data in an authentication response 245 that is returned to the authenticator application 240 via the encrypted channel.

At 525, the remote machine 210 may receive the authentication response 245 from the client machine 205. The authentication response 245 may include the user verification data associated with the user 185 of the client machine 205, an identifier of the client machine 205, and a first digital signature of the authenticator application 235 running on the client machine 205. The remote machine 210 may receive the authentication response 245 from the client machine 205 via the encrypted channel between the authenticator application 235 and the authenticator application 240. In some implementations, the encrypted channel may include an SSH channel or virtual channel established via the remote connection module 220 of the remote machine 210.

At 530, the authenticator application 240 running on the remote machine 210 may generate an authentication response 270 that contains the user verification data, the identifier of the client machine 205, an identifier of the remote machine 210, the first digital signature of the authenticator application 235 running on the client machine 205, and a second digital signature of the authenticator application 240 running on the remote machine 210. In some examples, the authentication response 270 may include an attestation of the machine's identity. Within this attestation, the remote machine 210 may wrap the registration request 265 provided by the authenticator application 235, thereby establishing the user's identity. In other words, the authenticator application 240 (e.g., the remote authenticator) may attest to the remote machine's identity, and the authenticator application 235 on the client machine 205 may handle other aspects of cryptographic attestation.

At 535, the authenticator application 240 may transmit the authentication response 270 to the authentication API endpoint 290 of the identity management system 120. At 540, the identity management system 120 may authorize the user 185 of the client machine 205 to access the one or more resources via the remote machine 210 after verifying the authentication response 270 provided by the authenticator application 240. Accordingly, the identity management system 120 may transmit a message 275 to the remote machine 210, indicating that access is granted. In some implementations, the message 275 may include a token or other information that enables the remote machine 210 to gain access to the one or more resources. In some examples, the identity management system 120 may redirect the remote machine 210 to the one or more resources requested by the user 185.

Figure 6:
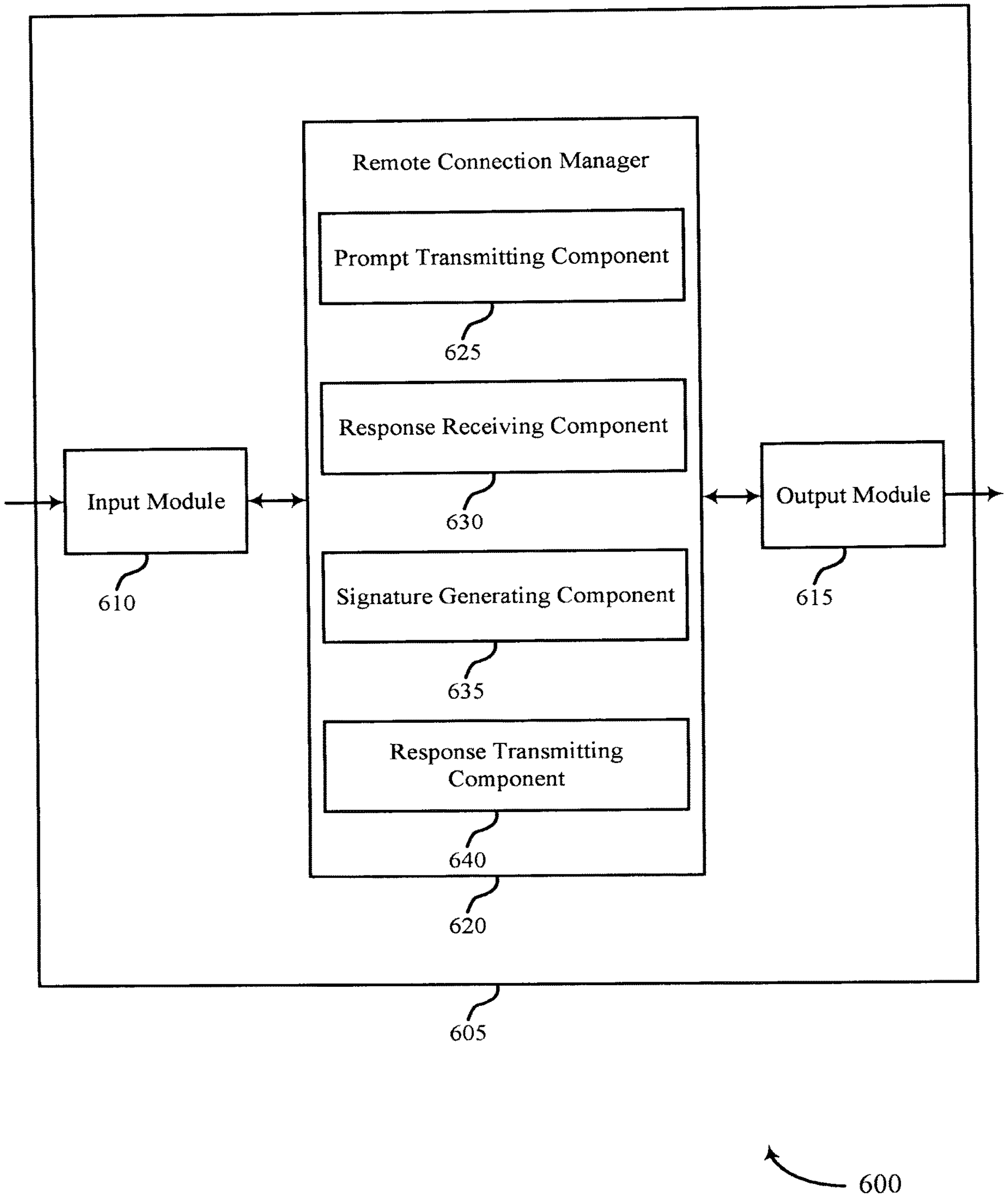
FIG. 6 shows a block diagram of an apparatus that supports authentication tunneling mechanisms for remote connections in accordance with aspects of the present disclosure.

FIG. 6 shows a block diagram 600 of a device 605 (such as a remote machine) that supports authentication tunneling mechanisms for remote connections in accordance with aspects of the present disclosure. The device 605 may include an input module 610, an output module 615, and a remote connection manager 620. The device 605, or one of more components of the device 605 (e.g., the input module 610, the output module 615, and the remote connection manager 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the remote connection manager 620 to support authentication tunneling mechanisms for remote connections. In some cases, the input module 610 may be a component of an input/output (I/O) controller 810, as described with reference to FIG. 8.

The output module 615 may manage output signals for the device 605. For example, the output module 615 may receive signals from other components of the device 605, such as the remote connection manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810, as described with reference to FIG. 8.

For example, the remote connection manager 620 may include a prompt transmitting component 625, a response receiving component 630, a signature generating component 635, a response transmitting component 640, or any combination thereof. In some examples, the remote connection manager 620, or various components thereof, may be configured to perform various operations (e.g., receiving, monitoring, transmitting) using or otherwise in cooperation with the input module 610, the output module 615, or both. For example, the remote connection manager 620 may receive information from the input module 610, send information to the output module 615, or be integrated in combination with the input module 610, the output module 615, or both to receive information, transmit information, or perform various other operations as described herein.

The remote connection manager 620 may support authentication tunneling in accordance with examples disclosed herein. The prompt transmitting component 625 may be configured as or otherwise support a means for transmitting an authentication prompt to a client machine via an encrypted channel between a first authenticator application running on the remote machine and a second authenticator application running on the client machine, the authentication prompt associated with accessing one or more resources via an identity management system. The response receiving component 630 may be configured as or otherwise support a means for receiving, from the client machine via the encrypted channel, a first authentication response including user verification data associated with a user of the client machine, an identifier of the client machine, and a first digital signature of the second authenticator application running on the client machine. The signature generating component 635 may be configured as or otherwise support a means for generating a second authentication response including the user verification data, the identifier of the client machine, an identifier of the remote machine, the first digital signature of the second authenticator application running on the client machine, and a second digital signature of the first authenticator application running on the remote machine. The response transmitting component 640 may be configured as or otherwise support a means for transmitting the second authentication response to an authentication endpoint of the identity management system.

Figure 7:
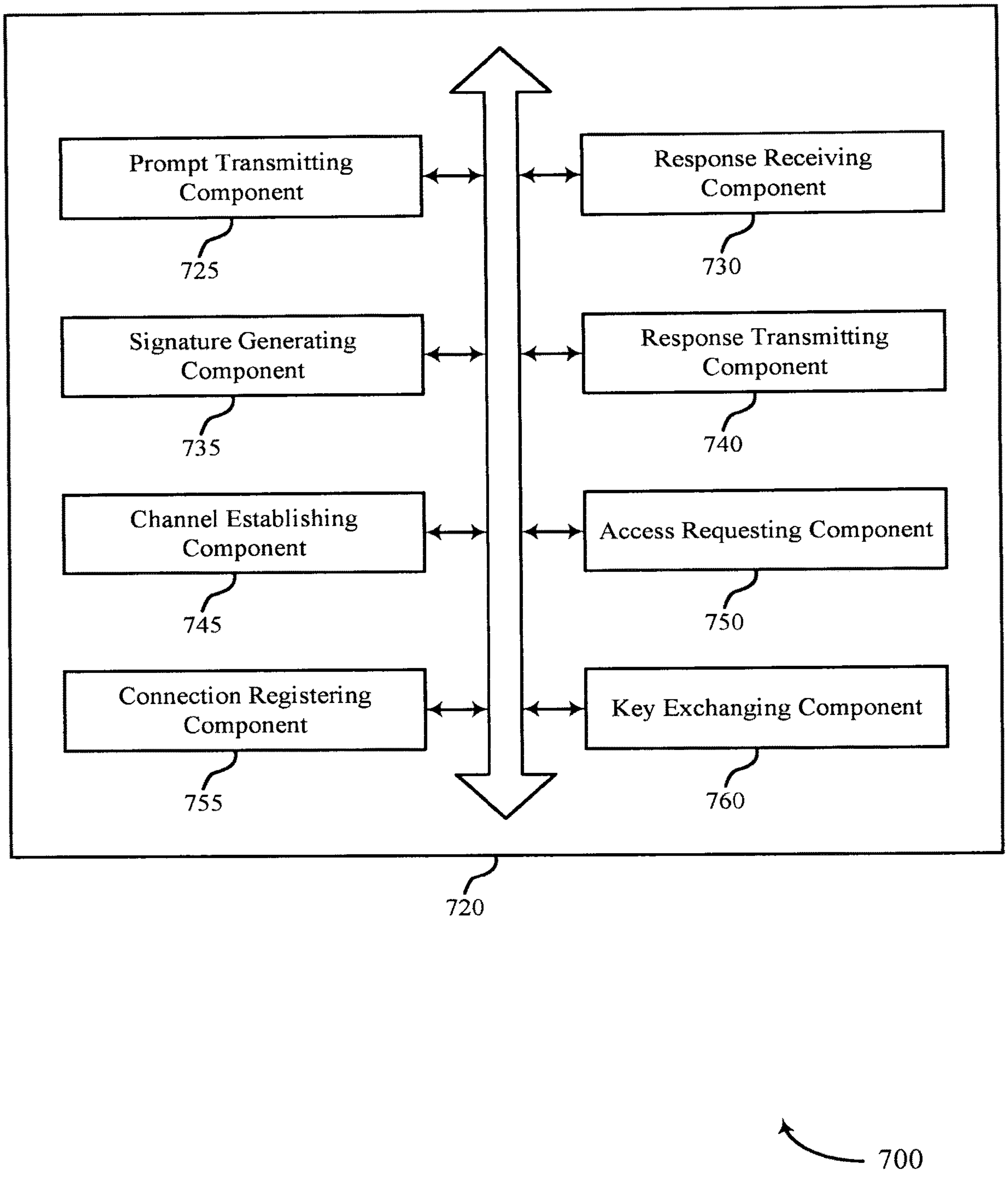
FIG. 7 shows a block diagram of a remote connection manager that supports authentication tunneling mechanisms for remote connections in accordance with aspects of the present disclosure.

FIG. 7 shows a block diagram 700 of a remote connection manager 720 that supports authentication tunneling mechanisms for remote connections in accordance with aspects of the present disclosure. The remote connection manager 720 may be an example of aspects of a remote connection manager 620, as described herein. The remote connection manager 720, or various components thereof, may be an example of means for performing various aspects of authentication tunneling mechanisms for remote connections, as described herein. For example, the remote connection manager 720 may include a prompt transmitting component 725, a response receiving component 730, a signature generating component 735, a response transmitting component 740, a channel establishing component 745, an access requesting component 750, a connection registering component 755, a key exchanging component 760, or any combination thereof. Each of these components, or components of subcomponents thereof (e.g., one or more processors, one or more memories), may communicate, directly or indirectly, with one another (e.g., via one or more buses).

The remote connection manager 720 may support authentication tunneling in accordance with examples disclosed herein. The prompt transmitting component 725 may be configured as or otherwise support a means for transmitting an authentication prompt to a client machine via an encrypted channel between a first authenticator application running on the remote machine and a second authenticator application running on the client machine, the authentication prompt associated with accessing one or more resources via an identity management system. The response receiving component 730 may be configured as or otherwise support a means for receiving, from the client machine via the encrypted channel, a first authentication response including user verification data associated with a user of the client machine, an identifier of the client machine, and a first digital signature of the second authenticator application running on the client machine. The signature generating component 735 may be configured as or otherwise support a means for generating a second authentication response including the user verification data, the identifier of the client machine, an identifier of the remote machine, the first digital signature of the second authenticator application running on the client machine, and a second digital signature of the first authenticator application running on the remote machine. The response transmitting component 740 may be configured as or otherwise support a means for transmitting the second authentication response to an authentication endpoint of the identity management system.

In some examples, the channel establishing component 745 may be configured as or otherwise support a means for establishing the encrypted channel between the remote machine and the client machine using a secret key accessible by the client machine, where the authentication prompt and the first authentication response are encrypted with the secret key.

In some examples, the channel establishing component 745 may be configured as or otherwise support a means for establishing a connection between a remote client module of the client machine and a remote connection module of the remote machine.

In some examples, the key exchanging component 760 may be configured as or otherwise support a means for exchanging the secret key in accordance with the connection, where establishing the encrypted channel using the secret key is based on the secret key being exchanged.

In some examples, the channel establishing component 745 may be configured as or otherwise support a means for establishing the encrypted channel via an authentication management service having a respective connection to the client machine and the remote machine.

In some examples, the channel establishing component 745 may be configured as or otherwise support a means for obtaining a set of credentials associated with the user of the client machine. In some examples, the channel establishing component 745 may be configured as or otherwise support a means for establishing the encrypted channel using the set of credentials.

In some examples, the set of credentials are obtained from an authentication management service based on verification of the set of credentials with the authentication management service, the authentication management service having a respective connection to the client machine and the remote machine.

In some examples, the encrypted channel between the first authenticator application and the second authenticator application includes an SSH channel or a virtual channel that is established using a remote connection module of the remote machine.

In some examples, the access requesting component 750 may be configured as or otherwise support a means for transmitting, to the authentication endpoint of the identity management system, a request to access the one or more resources via the identity management system.

In some examples, the access requesting component 750 may be configured as or otherwise support a means for receiving, from the authentication endpoint of the identity management system, the authentication prompt associated with accessing the one or more resources via the identity management system.

In some examples, the access requesting component 750 may be configured as or otherwise support a means for receiving, from the authentication endpoint of the identity management system, an indication that the remote machine is authorized to access the one or more resources via the identity management system.

In some examples, the connection registering component 755 may be configured as or otherwise support a means for transmitting, to a remote connection endpoint of the identity management system, a request to register a remote connection between the remote machine and a client machine, where authorization of the remote machine is based on verification of the second authentication response and the remote connection.

Figure 8:
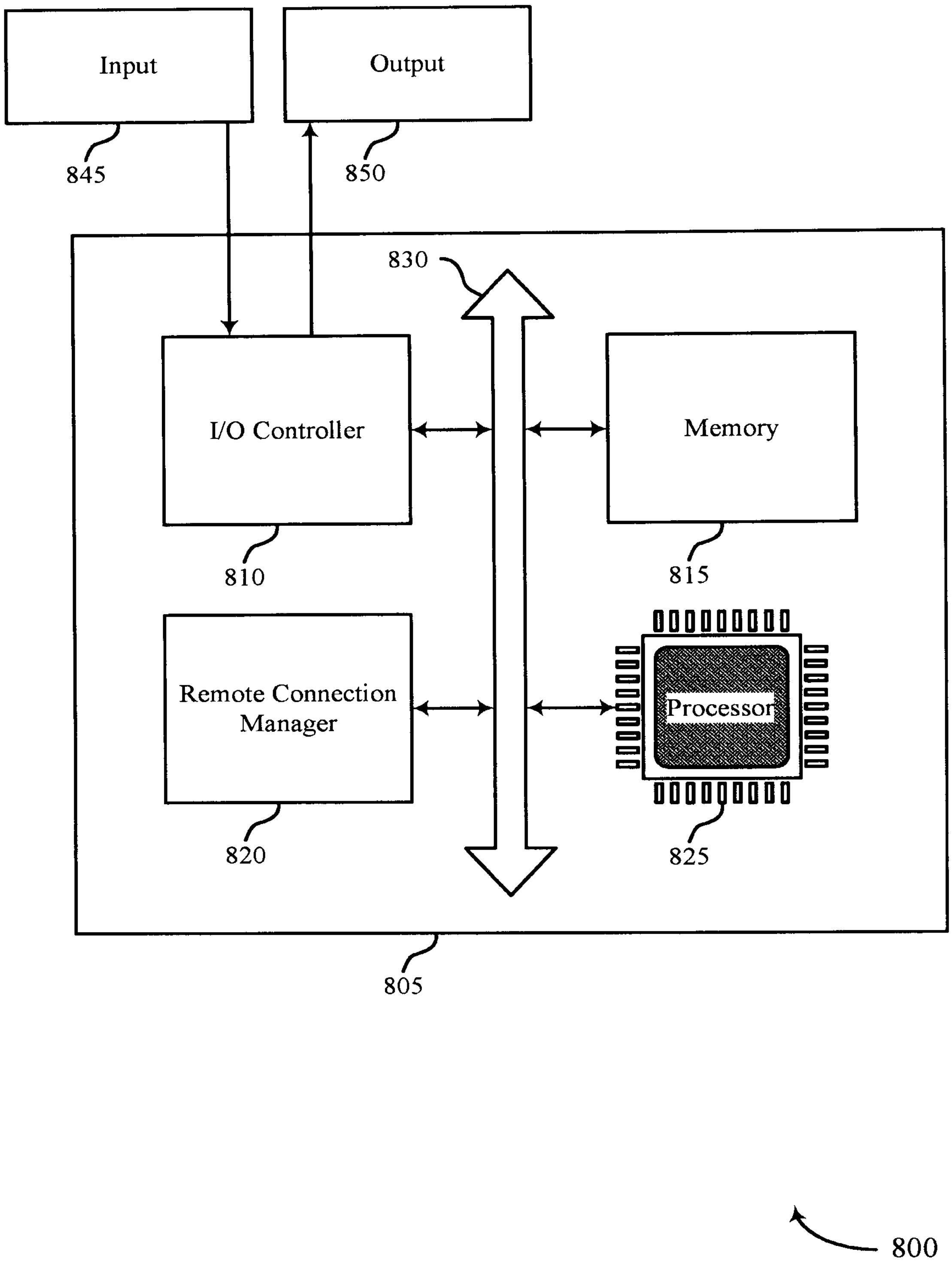
FIG. 8 shows a diagram of a system including a device that supports authentication tunneling mechanisms for remote connections in accordance with aspects of the present disclosure.

FIG. 8 shows a diagram of a system 800 including a device 805 (such as a remote machine) that supports authentication tunneling mechanisms for remote connections in accordance with aspects of the present disclosure. The device 805 may be an example of or include the components of a device 605, as described herein. The device 805 may include components for bi-directional data communications including components for transmitting and receiving communications, such as a remote connection manager 820, an I/O controller 810, at least one memory 815, and at least one processor 825. These components may be in electronic communication or otherwise coupled (e.g., operatively, communicatively, functionally, electronically, electrically) via one or more buses (e.g., a bus 830).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 825. In some examples, a user may interact with the device 805 via the I/O controller 810 or via hardware components controlled by the I/O controller 810.

Memory 815 may include random-access memory (RAM) and read-only memory (ROM). The memory 815 may store computer-readable, computer-executable software including instructions that, when executed, cause at least one processor 825 to perform various functions described herein. In some cases, the memory 815 may contain, among other things, a basic I/O system (BIOS) which may control basic hardware or software operation such as the interaction with peripheral components or devices. The memory 815 may be an example of a single memory or multiple memories. For example, the device 805 may include one or more memories 815.

The processor 825 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 825 may be configured to operate a memory array using a memory controller. In other cases, a memory controller may be integrated into the processor 825. The processor 825 may be configured to execute computer-readable instructions stored in at least one memory 815 to perform various functions (e.g., functions or tasks supporting authentication tunneling mechanisms for remote connections). The processor 825 may be an example of a single processor or multiple processors. For example, the device 805 may include one or more processors 825.

The remote connection manager 820 may support authentication tunneling in accordance with examples disclosed herein. For example, the remote connection manager 820 may be configured as or otherwise support a means for transmitting an authentication prompt to a client machine via an encrypted channel between a first authenticator application running on the remote machine and a second authenticator application running on the client machine, the authentication prompt associated with accessing one or more resources via an identity management system. The remote connection manager 820 may be configured as or otherwise support a means for receiving, from the client machine via the encrypted channel, a first authentication response including user verification data associated with a user of the client machine, an identifier of the client machine, and a first digital signature of the second authenticator application running on the client machine. The remote connection manager 820 may be configured as or otherwise support a means for generating a second authentication response including the user verification data, the identifier of the client machine, an identifier of the remote machine, the first digital signature of the second authenticator application running on the client machine, and a second digital signature of the first authenticator application running on the remote machine. The remote connection manager 820 may be configured as or otherwise support a means for transmitting the second authentication response to an authentication endpoint of the identity management system.

Figure 9:
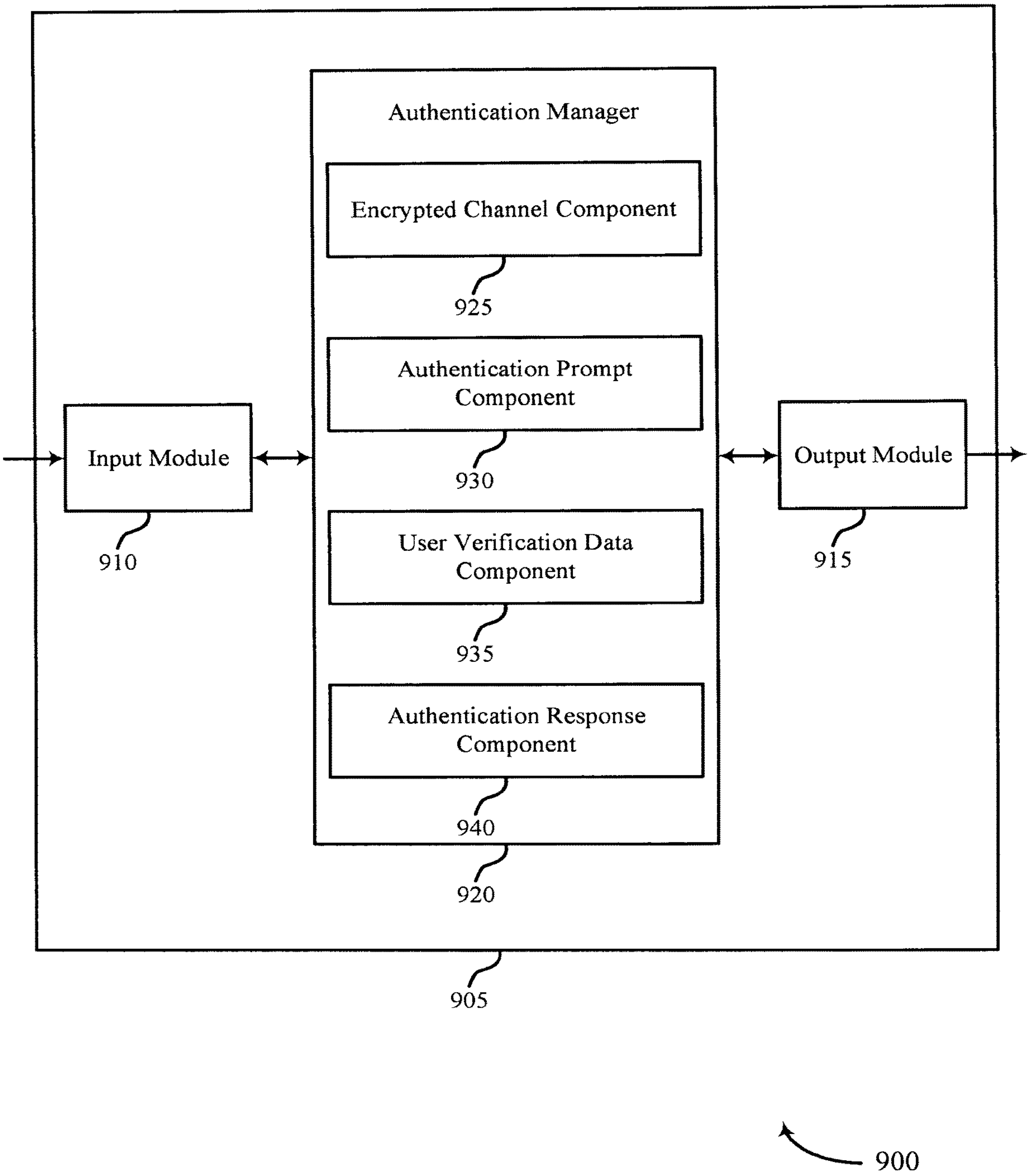
FIG. 9 shows a block diagram of an apparatus that supports authentication tunneling mechanisms for remote connections in accordance with aspects of the present disclosure.

FIG. 9 shows a block diagram 900 of a device 905 (such as a client machine) that supports authentication tunneling mechanisms for remote connections in accordance with aspects of the present disclosure. The device 905 may include an input module 910, an output module 915, and an authentication manager 920. The device 905, or one of more components of the device 905 (e.g., the input module 910, the output module 915, and the authentication manager 920), may include at least one processor, which may be coupled with at least one memory, to support the described techniques. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the authentication manager 920 to support authentication tunneling mechanisms for remote connections. In some cases, the input module 910 may be a component of an input/output (I/O) controller 1110, as described with reference to FIG. 11.

The output module 915 may manage output signals for the device 905. For example, the output module 915 may receive signals from other components of the device 905, such as the authentication manager 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110, as described with reference to FIG. 11.

For example, the authentication manager 920 may include an encrypted channel component 925, an authentication prompt component 930, a user verification data component 935, an authentication response component 940, or any combination thereof. In some examples, the authentication manager 920, or various components thereof, may be configured to perform various operations (e.g., receiving, monitoring, transmitting) using or otherwise in cooperation with the input module 910, the output module 915, or both. For example, the authentication manager 920 may receive information from the input module 910, send information to the output module 915, or be integrated in combination with the input module 910, the output module 915, or both to receive information, transmit information, or perform various other operations described herein.

The authentication manager 920 may support authentication tunneling in accordance with examples disclosed herein. The encrypted channel component 925 may be configured as or otherwise support a means for establishing an encrypted channel between a first authenticator application running on a remote machine and a second authenticator application running on the client machine, where the encrypted channel is established using a secret key accessible by the client machine. The authentication prompt component 930 may be configured as or otherwise support a means for receiving an authentication prompt from the remote machine via the encrypted channel, the authentication prompt associated with accessing one or more resources via an identity management system, where the authentication prompt is encrypted with the secret key associated with the client machine. The user verification data component 935 may be configured as or otherwise support a means for obtaining user verification data from a user of the client machine in accordance with the authentication prompt, where the user verification data is obtained using the second authenticator application running on the client machine. The authentication response component 940 may be configured as or otherwise support a means for transmitting, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

Figure 10:
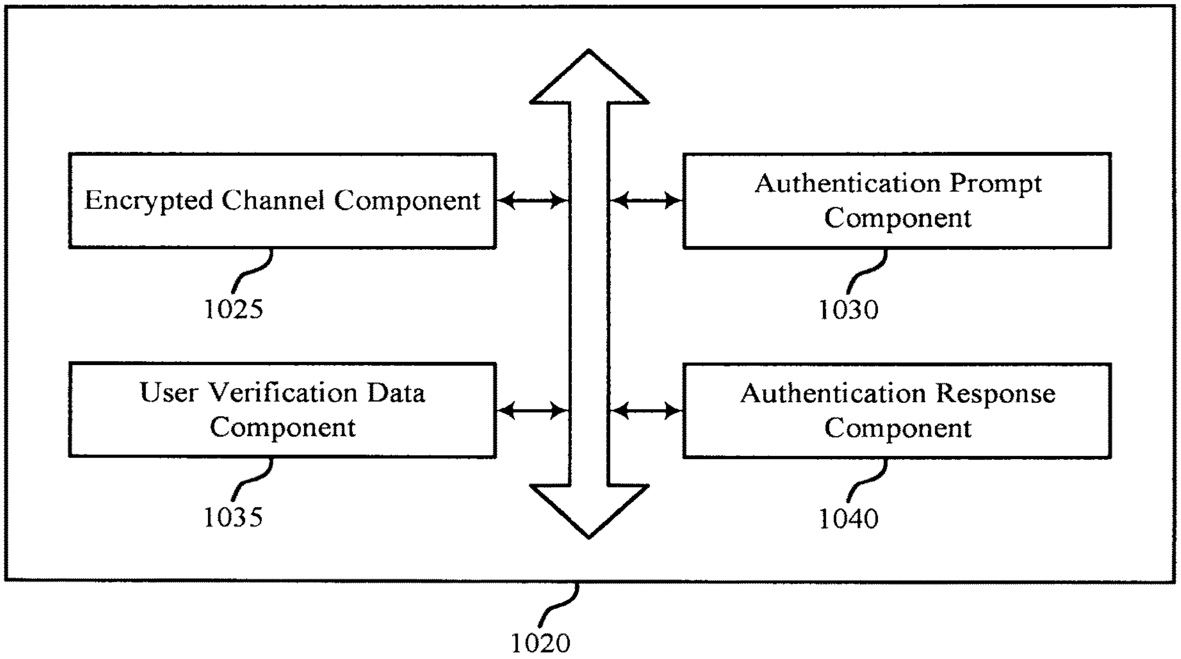
FIG. 10 shows a block diagram of an authentication manager that supports authentication tunneling mechanisms for remote connections in accordance with aspects of the present disclosure.

FIG. 10 shows a block diagram 1000 of an authentication manager 1020 that supports authentication tunneling mechanisms for remote connections in accordance with aspects of the present disclosure. The authentication manager 1020 may be an example of aspects of an authentication manager 920, as described herein. The authentication manager 1020, or various components thereof, may be an example of means for performing various aspects of authentication tunneling mechanisms for remote connections, as described herein. For example, the authentication manager 1020 may include an encrypted channel component 1025, an authentication prompt component 1030, a user verification data component 1035, an authentication response component 1040, or any combination thereof. Each of these components, or components of subcomponents thereof (e.g., one or more processors, one or more memories), may communicate, directly or indirectly, with one another (e.g., via one or more buses).

The authentication manager 1020 may support authentication tunneling in accordance with examples disclosed herein. The encrypted channel component 1025 may be configured as or otherwise support a means for establishing an encrypted channel between a first authenticator application running on a remote machine and a second authenticator application running on the client machine, where the encrypted channel is established using a secret key accessible by the client machine. The authentication prompt component 1030 may be configured as or otherwise support a means for receiving an authentication prompt from the remote machine via the encrypted channel, the authentication prompt associated with accessing one or more resources via an identity management system, where the authentication prompt is encrypted with the secret key associated with the client machine. The user verification data component 1035 may be configured as or otherwise support a means for obtaining user verification data from a user of the client machine in accordance with the authentication prompt, where the user verification data is obtained using the second authenticator application running on the client machine. The authentication response component 1040 may be configured as or otherwise support a means for transmitting, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

In some examples, to support obtaining the user verification data, the user verification data component 1035 may be configured as or otherwise support a means for obtaining the user verification data via one or more sensors or components integrated with the second authenticator application running on the client machine, where the user verification data includes biometric information associated with the user of the client machine.

In some examples, the authentication response component 1040 may be configured as or otherwise support a means for transmitting, to an authentication endpoint of the identity management system via the remote machine, a second authentication response including the user verification data, the identifier of the client machine, an identifier of the remote machine, the first digital signature generated by the second authenticator application running on the client machine, and a second digital signature generated by the first authenticator application running on the remote machine.

In some examples, the encrypted channel component 1025 may be configured as or otherwise support a means for establishing a connection between a remote client module of the client machine and a remote connection module of the remote machine. In some examples, the encrypted channel component 1025 may be configured as or otherwise support a means for exchanging the secret key via the connection, where establishing the encrypted channel using the secret key is based on exchanging the secret key.

In some examples, the encrypted channel component 1025 may be configured as or otherwise support a means for establishing the encrypted channel via an authentication management service having a respective connection to the client machine and the remote machine.

Figure 11:
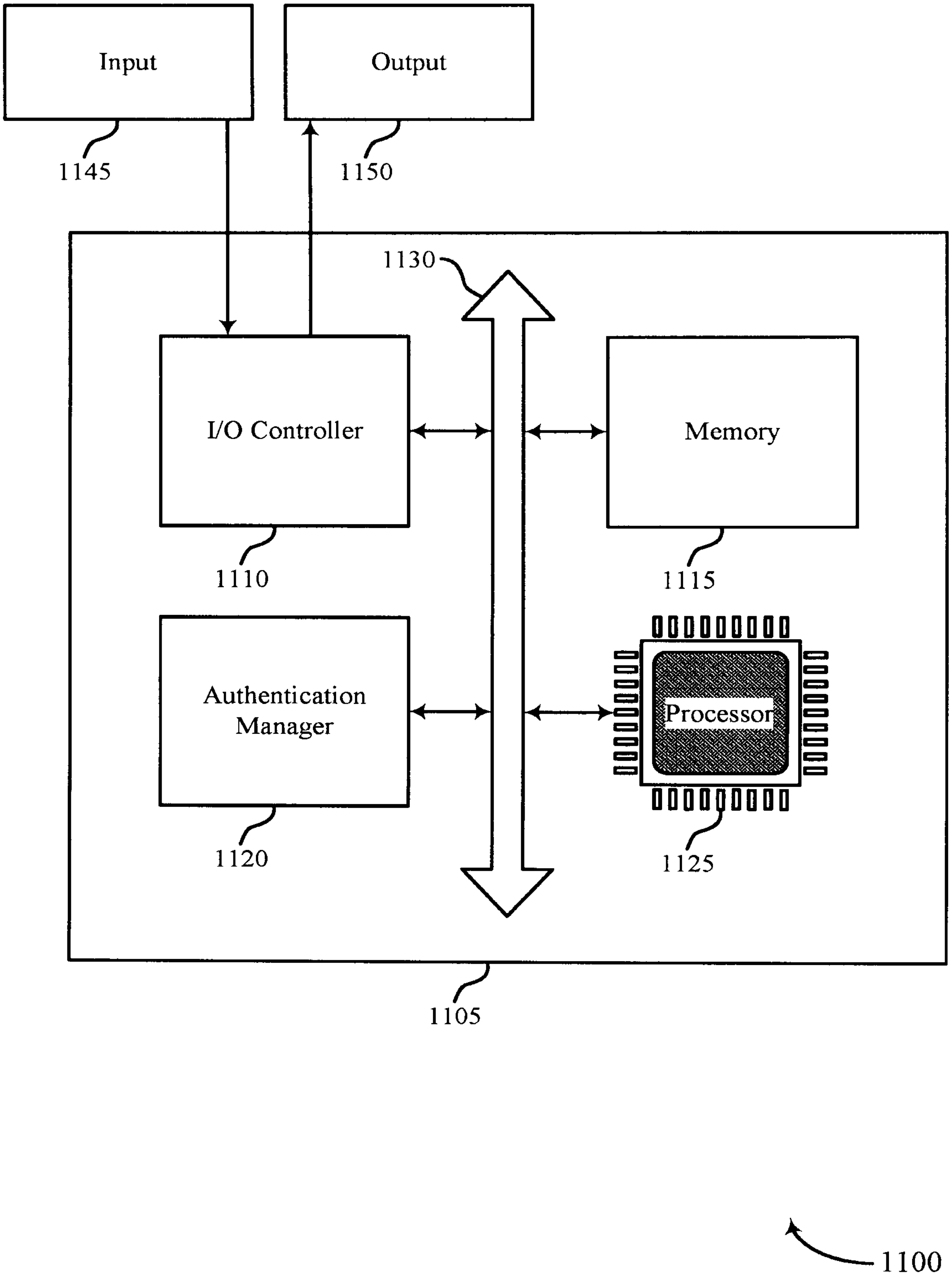
FIG. 11 shows a diagram of a system including a device that supports authentication tunneling mechanisms for remote connections in accordance with aspects of the present disclosure.

FIG. 11 shows a diagram of a system 1100 including a device 1105 (such as a client device) that supports authentication tunneling mechanisms for remote connections in accordance with aspects of the present disclosure. The device 1105 may be an example of or include the components of a device 905, as described herein. The device 1105 may include components for bi-directional data communications including components for transmitting and receiving communications, such as an authentication manager 1120, an I/O controller 1110, at least one memory 1115, and at least one processor 1125. These components may be in electronic communication or otherwise coupled (e.g., operatively, communicatively, functionally, electronically, electrically) via one or more buses (e.g., a bus 1130).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1125. In some examples, a user may interact with the device 1105 via the I/O controller 1110 or via hardware components controlled by the I/O controller 1110.

Memory 1115 may include RAM and ROM. The memory 1115 may store computer-readable, computer-executable software including instructions that, when executed, cause at least one processor 1125 to perform various functions described herein. In some cases, the memory 1115 may contain, among other things, a BIOS which may control basic hardware or software operation such as the interaction with peripheral components or devices. The memory 1115 may be an example of a single memory or multiple memories. For example, the device 1105 may include one or more memories 1115.

The processor 1125 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1125 may be configured to operate a memory array using a memory controller. In other cases, a memory controller may be integrated into the processor 1125. The processor 1125 may be configured to execute computer-readable instructions stored in at least one memory 1115 to perform various functions (e.g., functions or tasks supporting authentication tunneling mechanisms for remote connections). The processor 1125 may be an example of a single processor or multiple processors. For example, the device 1105 may include one or more processors 1125.

The authentication manager 1120 may support authentication tunneling in accordance with examples disclosed herein. For example, the authentication manager 1120 may be configured as or otherwise support a means for establishing an encrypted channel between a first authenticator application running on a remote machine and a second authenticator application running on the client machine, where the encrypted channel is established using a secret key accessible by the client machine. The authentication manager 1120 may be configured as or otherwise support a means for receiving an authentication prompt from the remote machine via the encrypted channel, the authentication prompt associated with accessing one or more resources via an identity management system, where the authentication prompt is encrypted with the secret key associated with the client machine. The authentication manager 1120 may be configured as or otherwise support a means for obtaining user verification data from a user of the client machine in accordance with the authentication prompt, where the user verification data is obtained using the second authenticator application running on the client machine. The authentication manager 1120 may be configured as or otherwise support a means for transmitting, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine.

Figure 12:
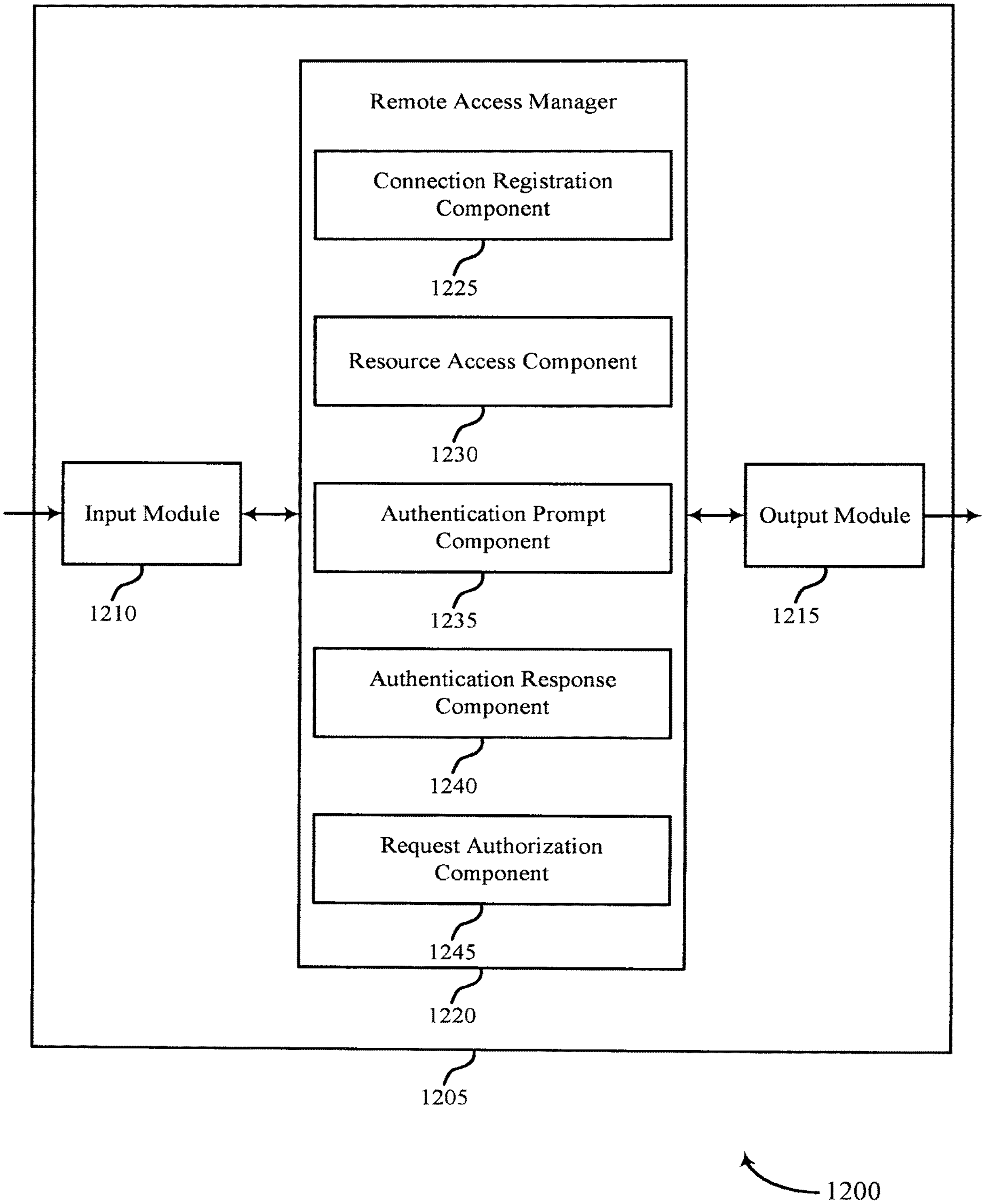
FIG. 12 shows a block diagram of an apparatus that supports authentication tunneling mechanisms for remote connections in accordance with aspects of the present disclosure.

FIG. 12 shows a block diagram 1200 of a device 1205 (such as an identity management system) that supports authentication tunneling mechanisms for remote connections in accordance with aspects of the present disclosure. The device 1205 may include an input module 1210, an output module 1215, and a remote access manager 1220. The device 1205, or one of more components of the device 1205 (e.g., the input module 1210, the output module 1215, and the remote access manager 1220), may include at least one processor, which may be coupled with at least one memory, to support the described techniques. Each of these components may be in communication with one another (e.g., via one or more buses).

The input module 1210 may manage input signals for the device 1205. For example, the input module 1210 may identify input signals based on an interaction with a modem, a keyboard, a mouse, a touchscreen, or a similar device. These input signals may be associated with user input or processing at other components or devices. In some cases, the input module 1210 may utilize an operating system such as iOS®, ANDROID®, MS-DOS®, MS-WINDOWS®, OS/2®, UNIX®, LINUX®, or another known operating system to handle input signals. The input module 1210 may send aspects of these input signals to other components of the device 1205 for processing. For example, the input module 1210 may transmit input signals to the remote access manager 1220 to support authentication tunneling mechanisms for remote connections. In some cases, the input module 1210 may be a component of an input/output (I/O) controller 1410, as described with reference to FIG. 14.

The output module 1215 may manage output signals for the device 1205. For example, the output module 1215 may receive signals from other components of the device 1205, such as the remote access manager 1220, and may transmit these signals to other components or devices. In some examples, the output module 1215 may transmit output signals for display in a user interface, for storage in a database or data store, for further processing at a server or server cluster, or for any other processes at any number of devices or systems. In some cases, the output module 1215 may be a component of an I/O controller 1410, as described with reference to FIG. 14.

For example, the remote access manager 1220 may include a connection registration component 1225, a resource access component 1230, an authentication prompt component 1235, an authentication response component 1240, a request authorization component 1245, or any combination thereof. In some examples, the remote access manager 1220, or various components thereof, may be configured to perform various operations (e.g., receiving, monitoring, transmitting) using or otherwise in cooperation with the input module 1210, the output module 1215, or both. For example, the remote access manager 1220 may receive information from the input module 1210, send information to the output module 1215, or be integrated in combination with the input module 1210, the output module 1215, or both to receive information, transmit information, or perform various other operations as described herein.

The remote access manager 1220 may support authentication tunneling in accordance with examples disclosed herein. The connection registration component 1225 may be configured as or otherwise support a means for receiving, from a first authenticator application running on a remote machine, a request to register a remote connection between the remote machine and a client machine. The resource access component 1230 may be configured as or otherwise support a means for receiving, from the remote machine via an authentication endpoint of the identity management system, a request to access one or more resources via the identity management system. The authentication prompt component 1235 may be configured as or otherwise support a means for transmitting an authentication prompt to the remote machine via the authentication endpoint of the identity management system, the authentication prompt associated with accessing the one or more resources via the identity management system. The authentication response component 1240 may be configured as or otherwise support a means for receiving, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine. The request authorization component 1245 may be configured as or otherwise support a means for authorizing the remote machine to access the one or more resources based on verifying the authentication response.

Figure 13:
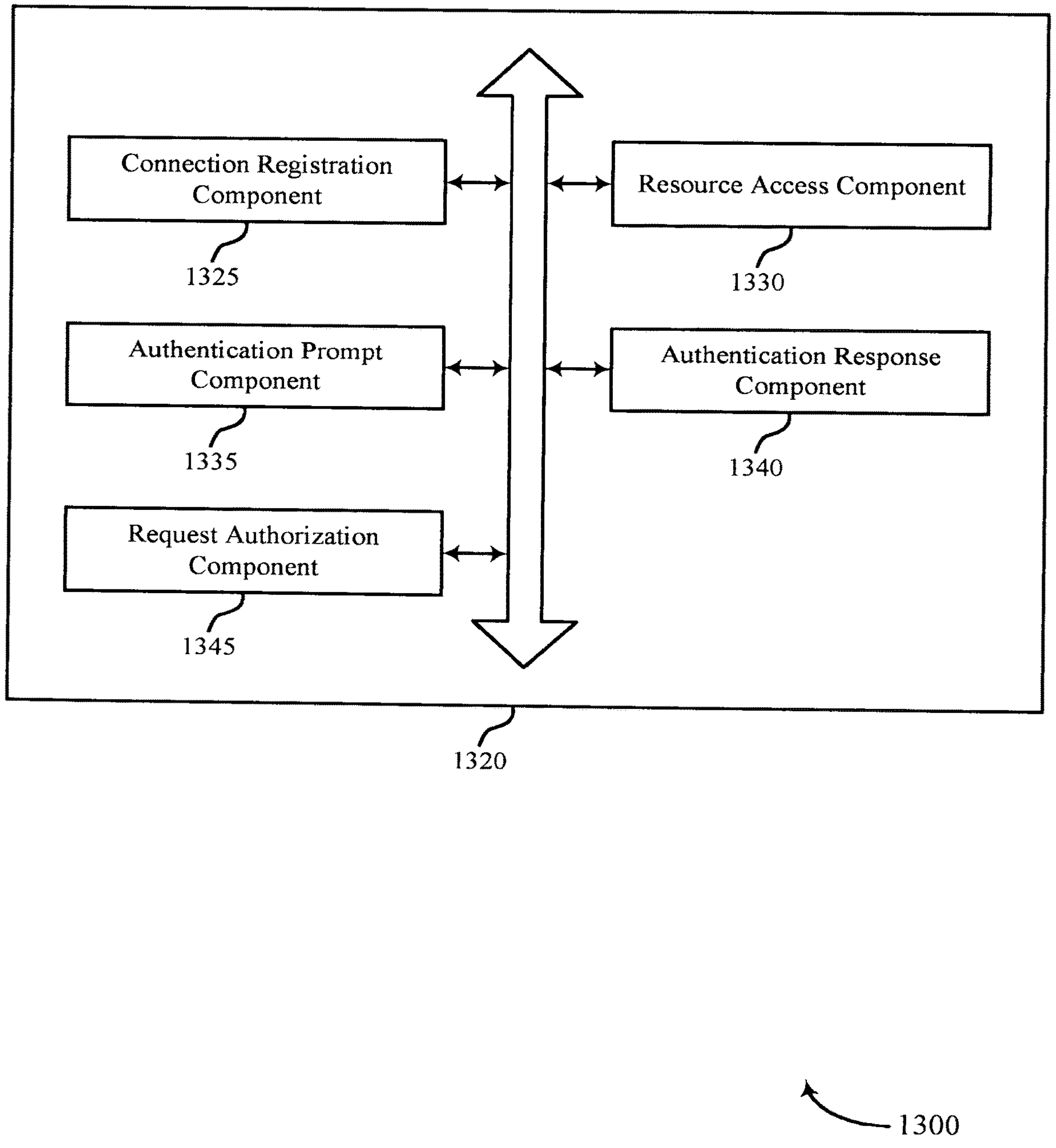
FIG. 13 shows a block diagram of a remote access manager that supports authentication tunneling mechanisms for remote connections in accordance with aspects of the present disclosure.

FIG. 13 shows a block diagram 1300 of a remote access manager 1320 that supports authentication tunneling mechanisms for remote connections in accordance with aspects of the present disclosure. The remote access manager 1320 may be an example of aspects of a remote access manager 1220, as described herein. The remote access manager 1320, or various components thereof, may be an example of means for performing various aspects of authentication tunneling mechanisms for remote connections as described herein. For example, the remote access manager 1320 may include a connection registration component 1325, a resource access component 1330, an authentication prompt component 1335, an authentication response component 1340, a request authorization component 1345, or any combination thereof. Each of these components, or components of subcomponents thereof (e.g., one or more processors, one or more memories), may communicate, directly or indirectly, with one another (e.g., via one or more buses).

The remote access manager 1320 may support authentication tunneling in accordance with examples disclosed herein. The connection registration component 1325 may be configured as or otherwise support a means for receiving, from a first authenticator application running on a remote machine, a request to register a remote connection between the remote machine and a client machine. The resource access component 1330 may be configured as or otherwise support a means for receiving, from the remote machine via an authentication endpoint of the identity management system, a request to access one or more resources via the identity management system. The authentication prompt component 1335 may be configured as or otherwise support a means for transmitting an authentication prompt to the remote machine via the authentication endpoint of the identity management system, the authentication prompt associated with accessing the one or more resources via the identity management system. The authentication response component 1340 may be configured as or otherwise support a means for receiving, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine. The request authorization component 1345 may be configured as or otherwise support a means for authorizing the remote machine to access the one or more resources based on verifying the authentication response.

In some examples, to support authorizing the remote machine, the request authorization component 1345 may be configured as or otherwise support a means for verifying the first digital signature using a first set of credentials associated with the user of the client machine. In some examples, to support authorizing the remote machine, the request authorization component 1345 may be configured as or otherwise support a means for verifying the second digital signature using a second set of credentials associated with the user of the client machine.

In some examples, to support authorizing the remote machine, the request authorization component 1345 may be configured as or otherwise support a means for verifying that the user of the client machine is authorized to access the remote machine based on determining that that remote connection between the remote machine and the client machine is registered with the identity management system.

Figure 14:
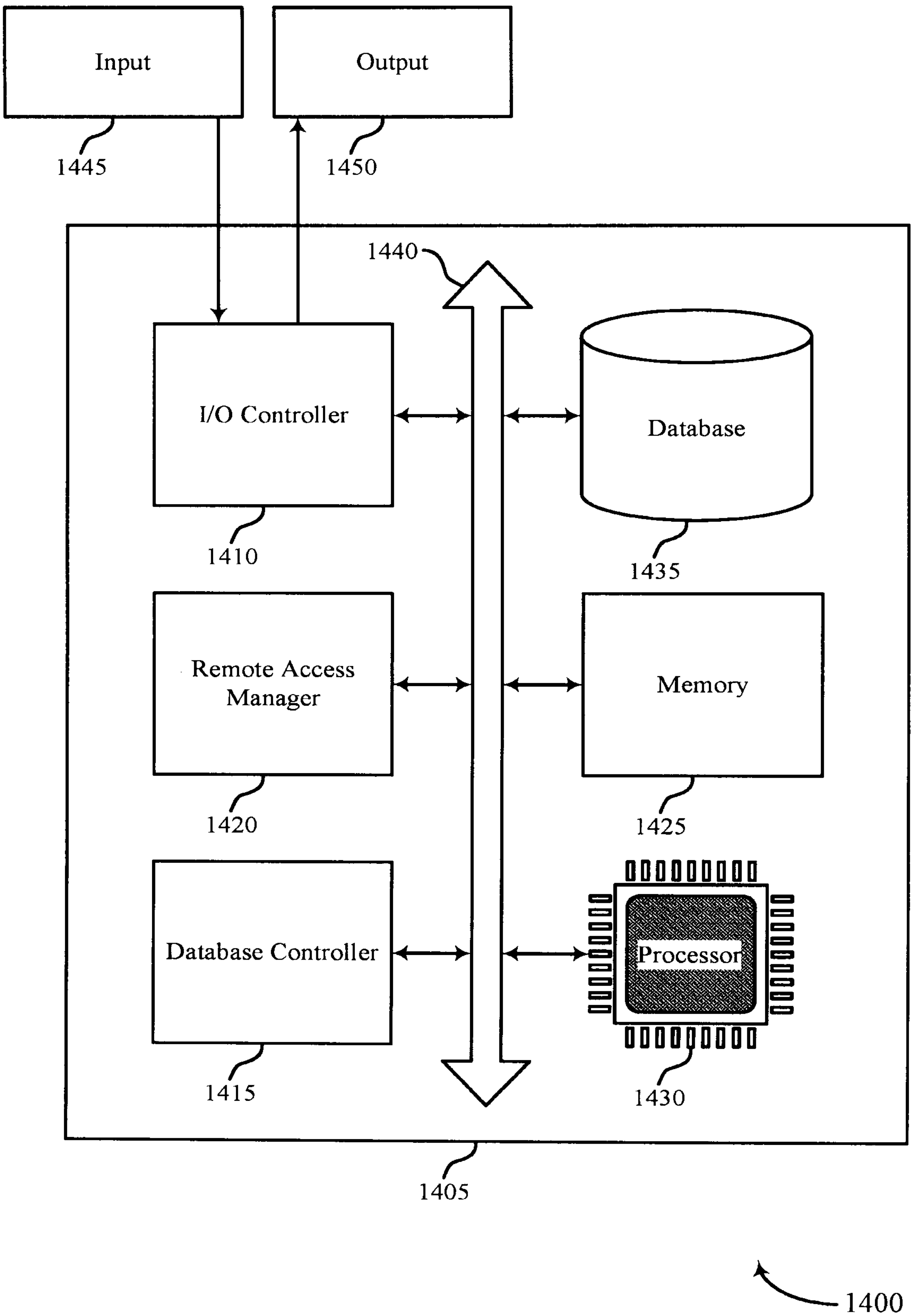
FIG. 14 shows a diagram of a system including a device that supports authentication tunneling mechanisms for remote connections in accordance with aspects of the present disclosure.

FIG. 14 shows a diagram of a system 1400 including a device 1405 (such as an identity management system) that supports authentication tunneling mechanisms for remote connections in accordance with aspects of the present disclosure. The device 1405 may be an example of or include the components of a device 1205, as described herein. The device 1405 may include components for bi-directional data communications including components for transmitting and receiving communications, such as a remote access manager 1420, an I/O controller 1410, a database controller 1415, at least one memory 1425, at least one processor 1430, and a database 1435. These components may be in electronic communication or otherwise coupled (e.g., operatively, communicatively, functionally, electronically, electrically) via one or more buses (e.g., a bus 1440).

The I/O controller 1410 may manage input signals 1445 and output signals 1450 for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. In other cases, the I/O controller 1410 may represent or interact with a modem, a keyboard, a mouse, a touchscreen, or a similar device. In some cases, the I/O controller 1410 may be implemented as part of a processor 1430. In some examples, a user may interact with the device 1405 via the I/O controller 1410 or via hardware components controlled by the I/O controller 1410.

The database controller 1415 may be operable to manage data storage and processing in a database 1435. In some cases, a user may interact with the database controller 1415. In other cases, the database controller 1415 may operate automatically without user interaction. The database 1435 may be an example of a single database, a distributed database, multiple distributed databases, a data store, a data lake, or an emergency backup database.

Memory 1425 may include RAM and ROM. The memory 1425 may store computer-readable, computer-executable software including instructions that, when executed, cause at least one processor 1430 to perform various functions described herein. In some cases, the memory 1425 may contain, among other things, a BIOS which may control basic hardware or software operation such as the interaction with peripheral components or devices. The memory 1425 may be an example of a single memory or multiple memories. For example, the device 1405 may include one or more memories 1425.

The processor 1430 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1430 may be configured to operate a memory array using a memory controller. In other cases, a memory controller may be integrated into the processor 1430. The processor 1430 may be configured to execute computer-readable instructions stored in at least one memory 1425 to perform various functions (e.g., functions or tasks supporting authentication tunneling mechanisms for remote connections). The processor 1430 may be an example of a single processor or multiple processors. For example, the device 1405 may include one or more processors 1430.

The remote access manager 1420 may support authentication tunneling in accordance with examples disclosed herein. For example, the remote access manager 1420 may be configured as or otherwise support a means for receiving, from a first authenticator application running on a remote machine, a request to register a remote connection between the remote machine and a client machine. The remote access manager 1420 may be configured as or otherwise support a means for receiving, from the remote machine via an authentication endpoint of the identity management system, a request to access one or more resources via the identity management system. The remote access manager 1420 may be configured as or otherwise support a means for transmitting an authentication prompt to the remote machine via the authentication endpoint of the identity management system, the authentication prompt associated with accessing the one or more resources via the identity management system. The remote access manager 1420 may be configured as or otherwise support a means for receiving, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine. The remote access manager 1420 may be configured as or otherwise support a means for authorizing the remote machine to access the one or more resources based on verifying the authentication response.

Figure 15:
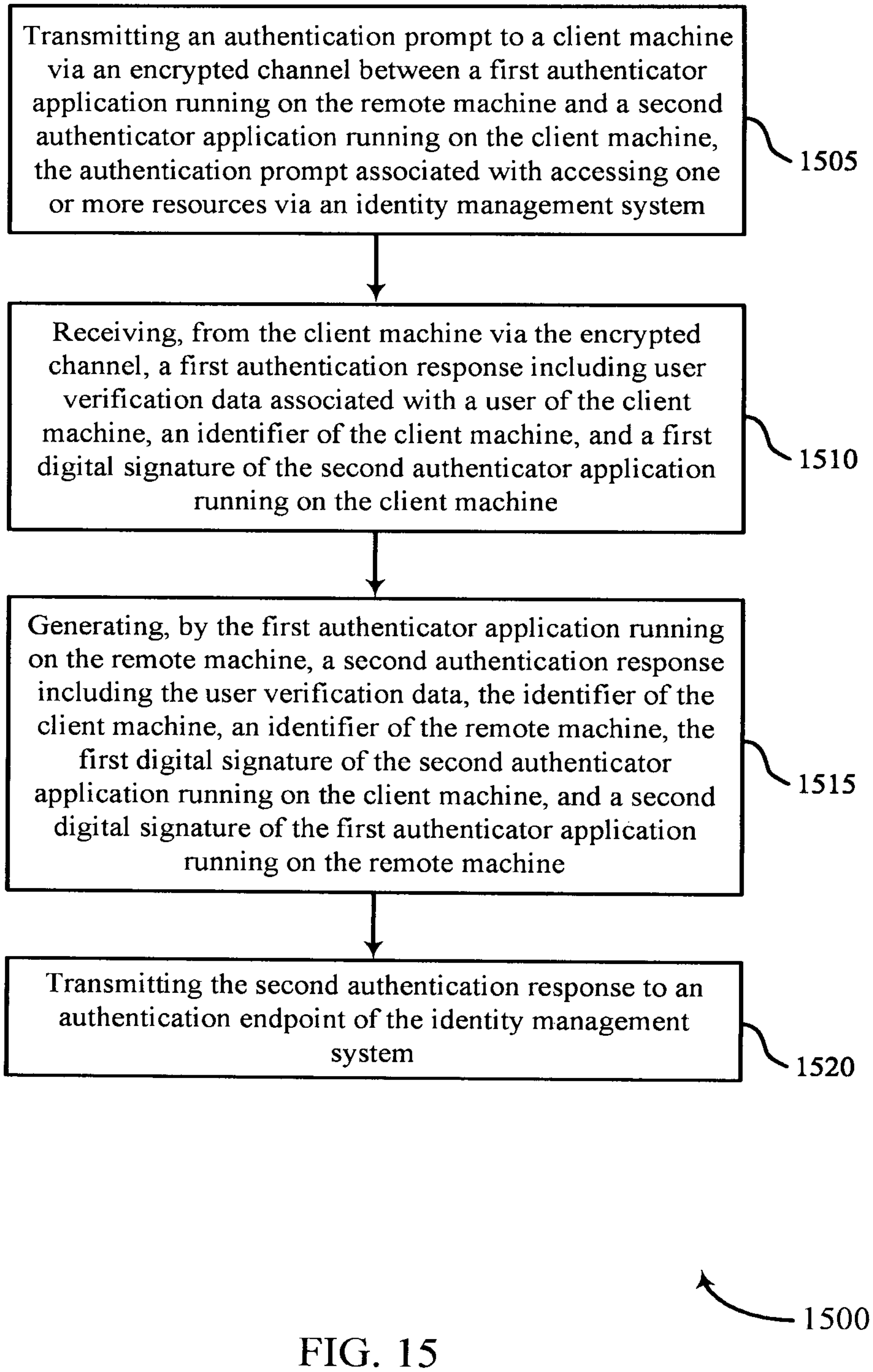
FIGS. 15 through 17 show flowcharts illustrating methods that support authentication tunneling mechanisms for remote connections in accordance with aspects of the present disclosure.

FIG. 15 shows a flowchart illustrating a method 1500 that supports authentication tunneling mechanisms for remote connections in accordance with aspects of the present disclosure. The operations of the method 1500 may be implemented by a remote machine or components thereof. For example, the operations of the method 1500 may be performed by a remote machine, such as the remote machine 210 shown and described with reference to FIGS. 1 through 8. In some examples, the remote machine may execute a set of instructions to control the functional elements of the remote machine to perform the described functions. Additionally, or alternatively, the remote machine may perform aspects of the described functions using special-purpose hardware.

At 1505, the method may include transmitting an authentication prompt to a client machine via an encrypted channel between a first authenticator application running on the remote machine and a second authenticator application running on the client machine, the authentication prompt associated with accessing one or more resources via an identity management system. In some examples, aspects of the operations of 1505 may be performed by a prompt transmitting component 725, as described with reference to FIG. 7.

At 1510, the method may include receiving, from the client machine via the encrypted channel, a first authentication response including user verification data associated with a user of the client machine, an identifier of the client machine, and a first digital signature of the second authenticator application running on the client machine. In some examples, aspects of the operations of 1510 may be performed by a response receiving component 730, as described with reference to FIG. 7.

At 1515, the method may include generating, by the first authenticator application running on the remote machine, a second authentication response including the user verification data, the identifier of the client machine, an identifier of the remote machine, the first digital signature of the second authenticator application running on the client machine, and a second digital signature of the first authenticator application running on the remote machine. In some examples, aspects of the operations of 1515 may be performed by a signature generating component 735, as described with reference to FIG. 7.

At 1520, the method may include transmitting the second authentication response to an authentication endpoint of the identity management system. In some examples, aspects of the operations of 1520 may be performed by a response transmitting component 740, as described with reference to FIG. 7.

Figure 16:
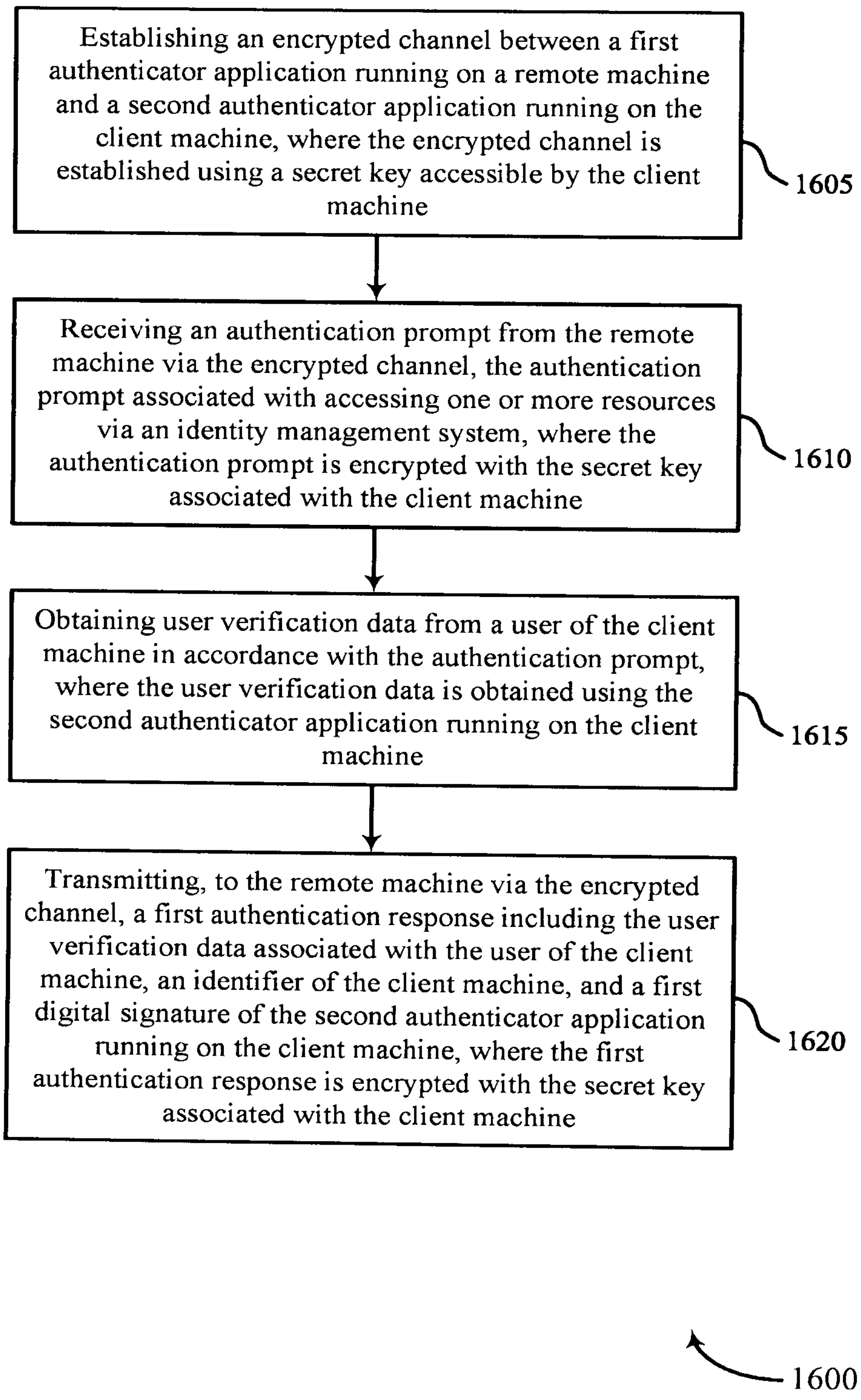

FIG. 16 shows a flowchart illustrating a method 1600 that supports authentication tunneling mechanisms for remote connections in accordance with aspects of the present disclosure. The operations of the method 1600 may be implemented by a client machine or components thereof. For example, the operations of the method 1600 may be performed by a client machine, such as the client machine 205 shown and described with reference to FIGS. 1 through 5 and 9 through 11. In some examples, the client machine may execute a set of instructions to control the functional elements of the client machine to perform the described functions. Additionally, or alternatively, the client machine may perform aspects of the described functions using special-purpose hardware.

At 1605, the method may include establishing an encrypted channel between a first authenticator application running on a remote machine and a second authenticator application running on the client machine, where the encrypted channel is established using a secret key accessible by the client machine. In some examples, aspects of the operations of 1605 may be performed by an encrypted channel component 1025, as described with reference to FIG. 10.

At 1610, the method may include receiving an authentication prompt from the remote machine via the encrypted channel, the authentication prompt associated with accessing one or more resources via an identity management system, where the authentication prompt is encrypted with the secret key associated with the client machine. In some examples, aspects of the operations of 1610 may be performed by an authentication prompt component 1030, as described with reference to FIG. 10.

At 1615, the method may include obtaining user verification data from a user of the client machine in accordance with the authentication prompt, where the user verification data is obtained using the second authenticator application running on the client machine. In some examples, aspects of the operations of 1615 may be performed by a user verification data component 1035, as described with reference to FIG. 10.

At 1620, the method may include transmitting, to the remote machine via the encrypted channel, a first authentication response including the user verification data associated with the user of the client machine, an identifier of the client machine, and a first digital signature of the second authenticator application running on the client machine, where the first authentication response is encrypted with the secret key associated with the client machine. In some examples, aspects of the operations of 1620 may be performed by an authentication response component 1040, as described with reference to FIG. 10.

Figure 17:
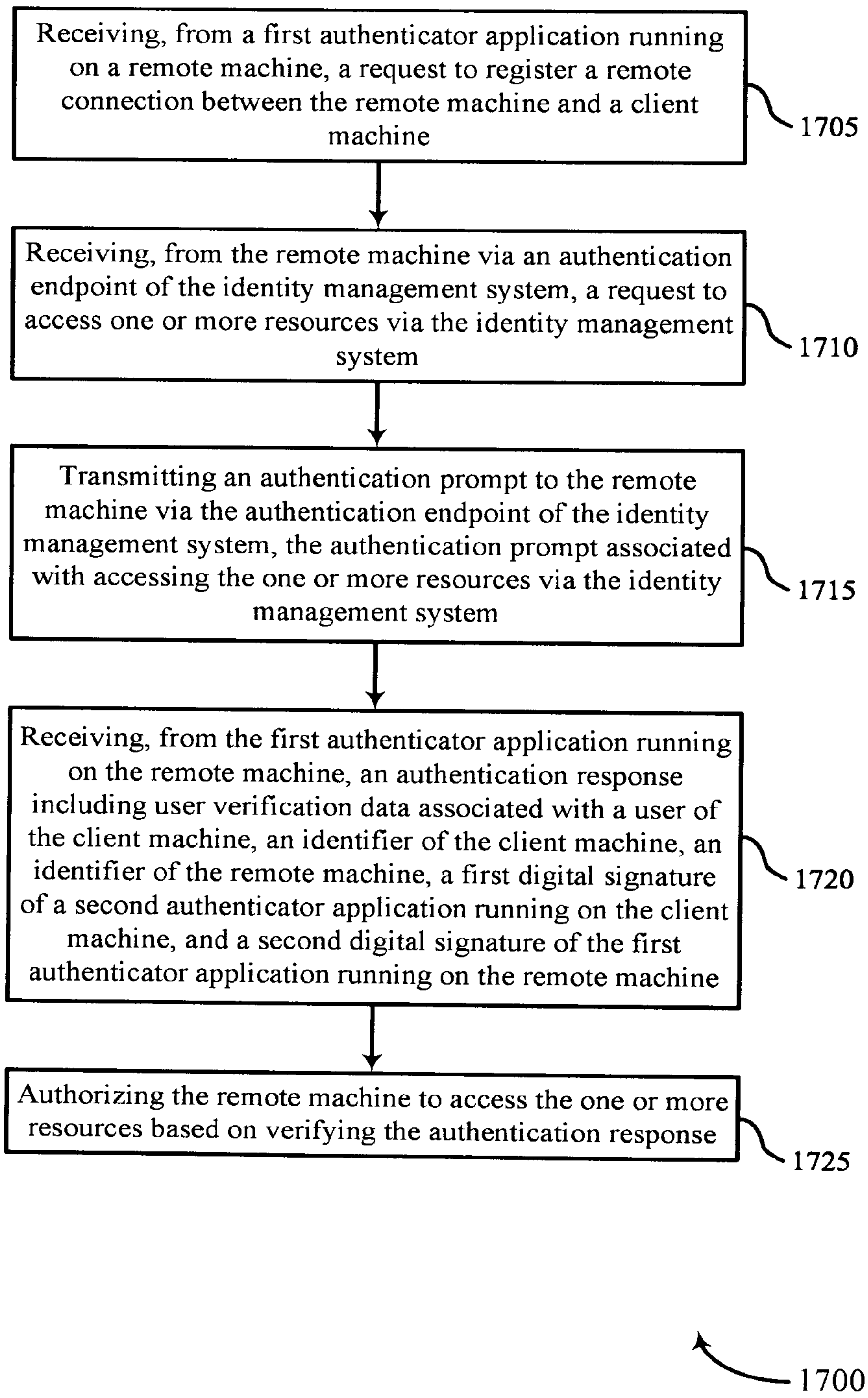

FIG. 17 shows a flowchart illustrating a method 1700 that supports authentication tunneling mechanisms for remote connections in accordance with aspects of the present disclosure. The operations of the method 1700 may be implemented by an identity management system or components thereof. For example, the operations of the method 1700 may be performed by an identity management system, such as the identity management system 120 shown and described with reference to FIGS. 1 through 5 and 12 through 14. In some examples, the identity management system may execute a set of instructions to control the functional elements of the identity management system to perform the described functions. Additionally, or alternatively, the identity management system may perform aspects of the described functions using special-purpose hardware.

At 1705, the method may include receiving, from a first authenticator application running on a remote machine, a request to register a remote connection between the remote machine and a client machine. In some examples, aspects of the operations of 1705 may be performed by a connection registration component 1325, as described with reference to FIG. 13.

At 1710, the method may include receiving, from the remote machine via an authentication endpoint of the identity management system, a request to access one or more resources via the identity management system. In some examples, aspects of the operations of 1710 may be performed by a resource access component 1330, as described with reference to FIG. 13.

At 1715, the method may include transmitting an authentication prompt to the remote machine via the authentication endpoint of the identity management system, the authentication prompt associated with accessing the one or more resources via the identity management system. In some examples, aspects of the operations of 1715 may be performed by an authentication prompt component 1335, as described with reference to FIG. 13.

At 1720, the method may include receiving, from the first authenticator application running on the remote machine, an authentication response including user verification data associated with a user of the client machine, an identifier of the client machine, an identifier of the remote machine, a first digital signature of a second authenticator application running on the client machine, and a second digital signature of the first authenticator application running on the remote machine. In some examples, aspects of the operations of 1720 may be performed by an authentication response component 1340, as described with reference to FIG. 13.

At 1725, the method may include authorizing the remote machine to access the one or more resources based on verifying the authentication response. In some examples, aspects of the operations of 1725 may be performed by a request authorization component 1345, as described with reference to FIG. 13.

The Following Provides an Overview of Aspects of the Present Disclosure:

Aspect 1: A method for authentication tunneling at a remote machine, comprising: transmitting an authentication prompt to a client machine via an encrypted channel between a first authenticator application running on the remote machine and a second authenticator application running on the client machine, the authentication prompt associated with accessing one or more resources via an identity management system; receiving, from the client machine via the encrypted channel, a first authentication response comprising user verification data associated with a user of the client machine, an identifier of the client machine, and a first digital signature of the second authenticator application running on the client machine; generating, by the first authenticator application running on the remote machine, a second authentication response comprising the user verification data, the identifier of the client machine, an identifier of the remote machine, the first digital signature of the second authenticator application running on the client machine, and a second digital signature of the first authenticator application running on the remote machine; and transmitting the second authentication response to an authentication endpoint of the identity management system.

Aspect 2: The method of aspect 1, further comprising: establishing the encrypted channel between the remote machine and the client machine using a secret key accessible by the client machine, wherein the authentication prompt and the first authentication response are encrypted with the secret key.

Aspect 3: The method of aspect 2, further comprising: establishing a connection between a remote client module of the client machine and a remote connection module of the remote machine; and exchanging the secret key in accordance with the connection, wherein establishing the encrypted channel using the secret key is based at least in part on the secret key being exchanged.

Aspect 4: The method of any of aspects 1 through 3, further comprising: establishing the encrypted channel via an authentication management service having a respective connection to the client machine and the remote machine.

Aspect 5: The method of any of aspects 1 through 4, further comprising: obtaining a set of credentials associated with the user of the client machine; and establishing the encrypted channel using the set of credentials.

Aspect 6: The method of aspect 5, wherein the set of credentials are obtained from an authentication management service based at least in part on a verification of the set of credentials with the authentication management service, the authentication management service having a respective connection to the client machine and the remote machine.

Aspect 7: The method of any of aspects 1 through 6, wherein the encrypted channel between the first authenticator application and the second authenticator application comprises an SSH channel or a virtual channel that is established using a remote connection module of the remote machine.

Aspect 8: The method of any of aspects 1 through 7, further comprising: transmitting, to the authentication endpoint of the identity management system, a request to access the one or more resources via the identity management system; and receiving, from the authentication endpoint of the identity management system, the authentication prompt associated with accessing the one or more resources via the identity management system.

Aspect 9: The method of any of aspects 1 through 8, further comprising: receiving, from the authentication endpoint of the identity management system, an indication that the remote machine is authorized to access the one or more resources via the identity management system.

Aspect 10: The method of any of aspects 1 through 9, further comprising: transmitting, to a remote connection endpoint of the identity management system, a request to register a remote connection between the remote machine and a client machine, wherein authorization of the remote machine is based at least in part on verification of the second authentication response and the remote connection.

Aspect 11: A method for authentication tunneling at a client machine, comprising: establishing an encrypted channel between a first authenticator application running on a remote machine and a second authenticator application running on the client machine, wherein the encrypted channel is established using a secret key accessible by the client machine; receiving an authentication prompt from the remote machine via the encrypted channel, the authentication prompt associated with accessing one or more resources via an identity management system, wherein the authentication prompt is encrypted with the secret key associated with the client machine; obtaining user verification data from a user of the client machine in accordance with the authentication prompt, wherein the user verification data is obtained using the second authenticator application running on the client machine; and transmitting, to the remote machine via the encrypted channel, a first authentication response comprising the user verification data associated with the user of the client machine, an identifier of the client machine, and a first digital signature of the second authenticator application running on the client machine, wherein the first authentication response is encrypted with the secret key associated with the client machine.

Aspect 12: The method of aspect 11, wherein obtaining the user verification data comprises: obtaining the user verification data via one or more sensors or components integrated with the second authenticator application running on the client machine, wherein the user verification data includes biometric information associated with the user of the client machine.

Aspect 13: The method of any of aspects 11 through 12, further comprising: transmitting, to an authentication endpoint of the identity management system via the remote machine, a second authentication response comprising the user verification data, the identifier of the client machine, an identifier of the remote machine, the first digital signature generated by the second authenticator application running on the client machine, and a second digital signature generated by the first authenticator application running on the remote machine.

Aspect 14: The method of any of aspects 11 through 13, further comprising: establishing a connection between a remote client module of the client machine and a remote connection module of the remote machine; and exchanging the secret key via the connection, wherein establishing the encrypted channel using the secret key is based at least in part on exchanging the secret key.

Aspect 15: The method of any of aspects 11 through 14, further comprising: establishing the encrypted channel via an authentication management service having a respective connection to the client machine and the remote machine.

Aspect 16: A method for authentication tunneling at an identity management system, comprising: receiving, from a first authenticator application running on a remote machine, a request to register a remote connection between the remote machine and a client machine; receiving, from the remote machine via an authentication endpoint of the identity management system, a request to access one or more resources via the identity management system; transmitting an authentication prompt to the remote machine via the authentication endpoint of the identity management system, the authentication prompt associated with accessing the one or more resources via the identity management system; receiving, from the first authenticator application running on the remote machine, an authentication response comprising user verification data associated with a user of the client machine, an identifier of the client machine, an identifier of the remote machine, a first digital signature of a second authenticator application running on the client machine, and a second digital signature of the first authenticator application running on the remote machine; and authorizing the remote machine to access the one or more resources based at least in part on verifying the authentication response.

Aspect 17: The method of aspect 16, wherein authorizing the remote machine comprises: verifying the first digital signature using a first set of credentials associated with the user of the client machine; and verifying the second digital signature using a second set of credentials associated with the user of the client machine.

Aspect 18: The method of any of aspects 16 through 17, wherein authorizing the remote machine comprises: verifying that the user of the client machine is authorized to access the remote machine based at least in part on determining that that remote connection between the remote machine and the client machine is registered with the identity management system.

Aspect 19: A remote machine, comprising: at least one memory that stores code; and one or more processors coupled with the at least one memory and individually or collectively operable to execute the code to cause the remote machine to perform a method of any of aspects 1 through 10.

Aspect 20: A remote machine, comprising at least one means for performing a method of any of aspects 1 through 10.

Aspect 21: A non-transitory computer-readable medium that stores code for authentication tunneling, the code comprising instructions executable by one or more processors to perform a method of any of aspects 1 through 10.

Aspect 22: A client machine, comprising: at least one memory that stores code; and one or more processors coupled with the at least one memory and individually or collectively operable to execute the code to cause the client machine to perform a method of any of aspects 11 through 15.

Aspect 23: A client machine, comprising at least one means for performing a method of any of aspects 11 through 15.

Aspect 24: A non-transitory computer-readable medium that stores code for authentication tunneling, the code comprising instructions executable by one or more processors to perform a method of any of aspects 11 through 15.

Aspect 25: An identity management system, comprising: at least one memory that stores code; and one or more processors coupled with at least one memory and individually or collectively operable to execute the code to cause the identity management system to perform a method of any of aspects 16 through 18.

Aspect 26: An identity management system, comprising at least one means for performing a method of any of aspects 16 through 18.

Aspect 27: A non-transitory computer-readable medium that stores code for authentication tunneling, the code comprising instructions executable by one or more processors to perform a method of any of aspects 16 through 18.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for authentication tunneling at a remote machine, comprising:

transmitting an authentication prompt to a client machine via an encrypted channel between a first authenticator application running on the remote machine and a second authenticator application running on the client machine, the authentication prompt associated with accessing one or more resources via an identity management system;

receiving, from the client machine via the encrypted channel in response to the authentication prompt, a first authentication response comprising user verification data associated with a user of the client machine, an identifier of the client machine, and a first digital signature of the second authenticator application running on the client machine;

generating, by the first authenticator application running on the remote machine, a second authentication response comprising the user verification data, the identifier of the client machine, an identifier of the remote machine, the first digital signature of the second authenticator application running on the client machine, and a second digital signature of the first authenticator application running on the remote machine; and transmitting the second authentication response to an authentication endpoint of the identity management system.

2. The method of claim 1, further comprising:

establishing the encrypted channel between the remote machine and the client machine using a secret key accessible by the client machine, wherein the authentication prompt and the first authentication response are encrypted with the secret key.

3. The method of claim 2, further comprising:

establishing a connection between a remote client module of the client machine and a remote connection module of the remote machine; and exchanging the secret key in accordance with the connection, wherein establishing the encrypted channel using the secret key is based at least in part on the secret key being exchanged.

4. The method of claim 1, further comprising:

establishing the encrypted channel via an authentication management service having a respective connection to the client machine and the remote machine.

5. The method of claim 1, further comprising:

obtaining a set of credentials associated with the user of the client machine; and establishing the encrypted channel using the set of credentials.

6. The method of claim 5, wherein the set of credentials are obtained from an authentication management service based at least in part on a verification of the set of credentials with the authentication management service, the authentication management service having a respective connection to the client machine and the remote machine.

7. The method of claim 1, wherein the encrypted channel between the first authenticator application and the second authenticator application comprises a secure shell (SSH) channel or a virtual channel that is established using a remote connection module of the remote machine.

8. The method of claim 1, further comprising:

transmitting, to the authentication endpoint of the identity management system, a request to access the one or more resources via the identity management system; and receiving, from the authentication endpoint of the identity management system, the authentication prompt associated with accessing the one or more resources via the identity management system.

9. The method of claim 1, further comprising:

receiving, from the authentication endpoint of the identity management system, an indication that the remote machine is authorized to access the one or more resources via the identity management system.

10. The method of claim 1, further comprising:

transmitting, to a remote connection endpoint of the identity management system, a request to register a remote connection between the remote machine and a client machine, wherein authorization of the remote machine is based at least in part on verification of the second authentication response and the remote connection.

11. A method for authentication tunneling at a client machine, comprising:

establishing an encrypted channel between a first authenticator application running on a remote machine and a second authenticator application running on the client machine, wherein the encrypted channel is established using a secret key accessible by the client machine;

receiving an authentication prompt from the remote machine via the encrypted channel, the authentication prompt associated with accessing one or more resources via an identity management system, wherein the authentication prompt is encrypted with the secret key associated with the client machine;

obtaining user verification data from a user of the client machine in accordance with the authentication prompt, wherein the user verification data is obtained using the second authenticator application running on the client machine; and transmitting, to the remote machine via the encrypted channel in response to the authentication prompt, a first authentication response comprising the user verification data associated with the user of the client machine, an identifier of the client machine, and a first digital signature of the second authenticator application running on the client machine, wherein the first authentication response is encrypted with the secret key associated with the client machine.

12. The method of claim 11, wherein obtaining the user verification data comprises:

obtaining the user verification data via one or more sensors or components integrated with the second authenticator application running on the client machine, wherein the user verification data includes biometric information associated with the user of the client machine.

13. The method of claim 11, further comprising:

transmitting, to an authentication endpoint of the identity management system via the remote machine, a second authentication response comprising the user verification data, the identifier of the client machine, an identifier of the remote machine, the first digital signature generated by the second authenticator application running on the client machine, and a second digital signature generated by the first authenticator application running on the remote machine.

14. The method of claim 11, further comprising:

establishing a connection between a remote client module of the client machine and a remote connection module of the remote machine; and exchanging the secret key via the connection, wherein establishing the encrypted channel using the secret key is based at least in part on exchanging the secret key.

15. The method of claim 11, further comprising:

establishing the encrypted channel via an authentication management service having a respective connection to the client machine and the remote machine.

* * * * *